United States Patent [19]
Hill

[11] Patent Number: 5,917,844
[45] Date of Patent: Jun. 29, 1999

[54] APPARATUS FOR GENERATING ORTHOGONALLY POLARIZED BEAMS HAVING DIFFERENT FREQUENCIES

[75] Inventor: Henry Allen Hill, Tucson, Ariz.

[73] Assignee: Zygo Corporation, Middlefield, Conn.

[21] Appl. No.: 08/960,881

[22] Filed: Oct. 30, 1997

Related U.S. Application Data

[63] Continuation-in-part of application No. 08/838,698, Apr. 25, 1997, abandoned.

[51] Int. Cl.$^6$ ........................................................ H01S 3/10
[52] U.S. Cl. .................................. 372/27; 372/22; 372/23; 372/13; 372/100; 372/105
[58] Field of Search ................................. 372/27, 23, 100, 372/105, 13, 66, 11, 22; 350/425, 312

[56] References Cited

U.S. PATENT DOCUMENTS

| | | |
|---|---|---|
| 3,458,259 | 7/1969 | Bagley et al. . |
| 3,656,853 | 4/1972 | Bagley et al. . |
| 3,662,279 | 5/1972 | Sandstrom et al. . |
| 3,889,207 | 6/1975 | Burgwald et al. . |
| 4,684,828 | 8/1987 | Sommargren . |
| 4,687,958 | 8/1987 | Sommargren . |
| 5,463,493 | 10/1995 | Shah ........................................ 359/312 |
| 5,485,272 | 1/1996 | Dirksen et al. . |

OTHER PUBLICATIONS

N. Bobroff, "Recent advances in displacement measuring interferometry," Meas. Sci. Technol. vol. 4, pp. 907–926 (Sep. 1993).

H. Matsumoto, "Recent interferometric measurements using stabilized lasers," Precision Engineering, vol. 6, pp. 87–94 (1984).

Y. Ohtsuka and K. Itoh, "Two–frequency Laser Interferometer for Small Displacement Measurements in a Low Frequency Range," Applied Optics, vol. 18, pp. 219–224 (1979).

N. Massie et al., "Measuring Laser Flow Fields With a 64–Channel Heterodyne Interferometer," Applied Optics, vol. 22, pp. 2141–2151 (1983).

Y. Ohtsuka and M. Tsubokawa, "Dynamic Two–frequency Interferometry for Small Displacement Measurements," Optics and Laser Technology, vol. 16, pp. 25–29 (1984).

N. A. Riza and M. M. K. Howlader, "Acousto–optic system for the generation and control of tunable low–frequency signals," Opt. Eng., vol. 35, pp. 920–925 (1996).

J. B. Ferguson and R. H. Morris, "Single Mode Collapse in 6328 A HeNe Lasers," Applied Optics, vol. 17, pp. 2924–2929 (1978).

(List continued on next page.)

*Primary Examiner*—Leon Scott, Jr.
*Attorney, Agent, or Firm*—Francis J. Caufield

[57] ABSTRACT

Electro-optical devices for transforming a single-frequency, linearly polarized input beam from a light source introduced into a multifaceted anisotropic acousto-optical crystal into an output beam having two orthogonally polarized, output beam components that differ in frequency from each other and may be parallel or have a predetermined angle of divergence between them. The energy flux profiles of the output beam components may be spatially separated, partially coextensive, or substantially coextensive in accordance with the birefringence, acoustical, and optical properties of the acousto-optical crystal and/or the use of external elements for particular device embodiments. The input beam is introduced to the acousto-optical crystal for travel through an interactive region where it experiences an acoustic beam that diffracts it via small angle Bragg diffraction to form two orthogonally polarized internal beam components that are separated by a small angle of divergence and subsequently are controlled to become beam components available outside of the acousto-optical crystal for use in downstream applications. Thermal compensation may be provided via the use external phase retardation plates and principles of symmetry, and high diffraction efficiency may be achieved via the use of multiple passes through the interaction zone.

87 Claims, 15 Drawing Sheets

OTHER PUBLICATIONS

T. Baer et al., "Frequency Stabilization of a 0.633 um He–Ne longitudinal Zeeman Laser," Applied Optics, vol. 19, pp. 3173–3177 (1980).

T. Okoshi and K. Kikuchi, "Frequency Stabilization of Semiconductor Lasers for Heterodyne–type Optical Communication Systems," Electronic Letters, vol. 16, pp. 179–181 (1980).

S. Yamagguchi and M. Suzuki, "Simultaneous Stabilization of the Frequency and Power of an AIGaAs Semiconductor Laser by Use of the Optogalvanic Effect of Krypton," IEEE Journal of Quantum Electronics, vol. QE–19, pp. 1514–1519 (1983).

R. W. Dixon "Acoustic Diffraction of Light in Anisotropic Media," IEEE Journal of Quantum Electronics, vol. QE–3, pp. 85–93 (1967).

A. Yariv and P. Yeh, Optical Waves in Crystals (Wiley, New York), Section 9.5.1 entitled "Small–Angle Bragg Diffraction" (1984).

J. Bennett and H. Bennett, Section 7 of Chapter 10, "Double Refraction in Calcite," Hanndbook of Optics (McGraw–Hill, New York) 1978.

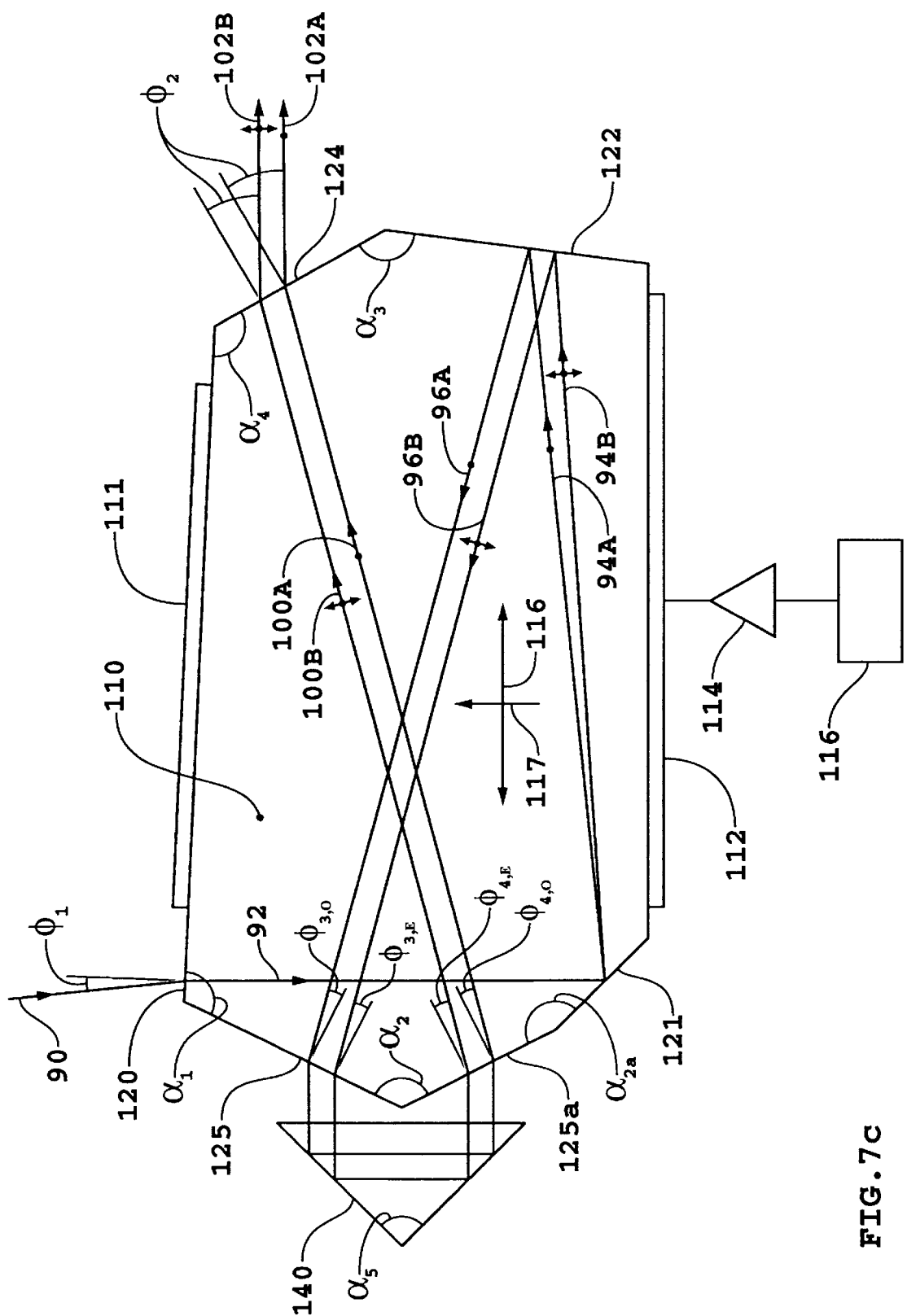

APPARATUS FOR GENERATING ORTHOGONALLY POLARIZED BEAMS HAVING DIFFERENT FREQUENCIES

CROSS REFERENCE TO RELATED APPLICATION

This application is a continuation-in-part of commonly owned U.S. patent application Ser. No. 08/838,698 filed on Apr. 25, 1997 in the name of Henry Allen Hill for "Apparatus For Generating Orthogonally Polarized, Parallel, Coextensive Beams Having Different Frequencies," now abandoned.

BACKGROUND OF THE INVENTION

1. Field of the Invention

The present invention relates to apparatus for transforming with high diffraction efficiency a single frequency, linearly polarized laser beam into a beam with two frequency components that are orthogonally polarized. More particularly, the invention relates to electro-optical apparatus that are useful in a variety of optical measuring devices that perform extremely accurate measurement of changes in either length or optical length.

2. The Prior Art

The use of optical interferometry to measure changes in either length, distance, or optical length has grown significantly due not only to technological advances in lasers, photosensors, and microelectronics but also to an ever increasing demand for high precision, high accuracy measurements [cf. N. Bobroff, "Recent advances in displacement measuring interferometry," *Meas. Sci. Technol.,* 4(9), 907–926 (1993)]. The prior art interferometers can be generally categorized into two types based on the signal processing technique used, i.e., either homodyne or heterodyne. The interferometers based on the heterodyne technique are generally preferred because (1) they are insensitive to low frequency drift and noise and (2) they can more readily have their resolution extended. Within the heterodyne type of interferometers, of particular interest are the ones based on the use of two optical frequencies.

In the prior art two-optical frequency heterodyne interferometers, the two optical frequencies are produced by one of the following techniques: (1) use of a Zeeman split laser, see for example, Bagley et al., U.S. Pat. No. 3,458,259, issued Jul. 29, 1969; G. Bouwhuis, "Interferometrie Mit Gaslasers," Ned. T. Natuurk, 34, 225–232 (August 1968); Bagley et al., U.S. Pat. No. 3,656,853, issued Apr. 18, 1972; and H. Matsumoto, "Recent interferometric measurements using stabilized lasers," *Precision Engineering,* 6(2), 87–94 (1984); (2) use of a pair of acousto-optical Bragg cells, see for example, Y. Ohtsuka and K. Itoh, "Two-frequency Laser Interferometer for Small Displacement Measurements in a Low Frequency Range," *Applied Optics,* 18(2), 219–224 (1979); N. Massie et al., "Measuring Laser Flow Fields With a 64-Channel Heterodyne Interferometer," *Applied Optics,* 22(14), 2141–2151 (1983); Y. Ohtsuka and M. Tsubokawa, "Dynamic Two-frequency Interferometry for Small Displacement Measurements," *Optics and Laser Technology,* 16, 25–29 (1984); H. Matsumoto, op. cit.; P. Dirksen, et al., U.S. Pat. No. 5,485,272, issued Jan. 16, 1996; N. A. Riza and M. M. K. Howlader, "Acousto-optic system for the generation and control of tunable low-frequency signals," *Opt. Eng.,* 35(4), 920–925 (1996); (3) use of a single acousto-optic Bragg cell, see for example, G. E. Sommargren, commonly owned U.S. Pat. No. 4,684,828, issued Aug. 4, 1987; G. E. Sommargren, commonly owned U.S. Pat. No. 4,687,958, issued Aug. 18, 1987; P. Dirksen, et al., op. cit.; or (4) use of two longitudinal modes of a randomly polarized HeNe laser, see for example, J. B. Ferguson and R. H. Morris, "Single Mode Collapse in 6328 Å HeNe Lasers," *Applied Optics,* 17(18), 2924–2929 (1978).

As for the prior art use of a Zeeman split laser to produce the two optical frequencies, this approach is only applicable to certain lasers (e.g., HeNe) and limits the frequency difference between the two optical frequencies to about 2 MHz. This imposes a limit on the maximum rate of change of the length or optical length being measured. In addition, the available power from a Zeeman split laser is less than 500 microwatts which can be a serious limitation when one laser source must be used for the measurement of multiple axes, such as three to six axes.

As for the prior art use of a single Bragg cell in the commonly owned U.S. Pat. No. 4,687,958 by Sommargren, the diffraction efficiency may be low because the optic axis of the uniaxial crystal of the Bragg cell, the direction of the input optical beam, and the direction of the acoustic beam are approximately collinear and under these conditions, a small change in the direction of the input beam such as caused by diffraction, will result in an unacceptable momentum mismatch. Also in commonly owned U.S. Pat. No. 4,687,958 by Sommargren, the diffraction efficiency may be low for a number of different types of uniaxial crystals because the efficiency of the dominant Bragg diffraction mode in this group of uniaxial crystals is proportional to the sine of the angle between the optic axis of the uniaxial crystal and either one or the other of the directions of the optical beam components or the direction of the acoustic beam. These two potential low diffraction efficiency problems are not encountered in the present invention because the optic axis of the uniaxial crystal and the direction of the acoustic beam are approximately orthogonal, i.e. small angle Bragg diffraction.

To compensate for the possibility of low diffraction efficiency resulting from the latter of these two reasons in U.S. Pat. No. 4,687,958, the path length in the uniaxial crystal of the Bragg cell may be increased. However, this procedure may lead to a uniaxial crystal that is inordinately long which in turn can result in an expensive apparatus. Also an extended length may lead to a diffracted beam with width elongated in the plane of diffraction and an increased lateral separation also in the diffraction plane between orthogonally polarized beam components. In addition, if the uniaxial crystal in the Bragg cell of commonly owned U.S. Pat. No. 4,687,958 is optically active (e.g., quartz), there may be an accompanying reduction in the diffraction efficiency which subsequently requires a further increase in the required path length in the uniaxial crystal for what is already an expensive apparatus.

The angle between the optic axis and acoustic beam can also be increased in commonly owned U.S. Pat. No. 4,687,958 by Sommargren in order to achieve a reduction of the momentum mismatch problem and of the required path length. However, this angle can only be increased up to approximately 27 degrees because for larger angles, the orthogonally polarized beam components generally will suffer total internal reflection at the exit face of the uniaxial crystal and the device would cease to function.

As for the prior art use of a single Bragg cell in commonly owned U.S. Pat. No. 4,684,828 by Sommargren, the apparatus has many parts which are separated and require more space, is sensitive to misalignment of the various parts, is more sensitive to thermal gradients in the apparatus as a result of multiple parts and the required separation of multiple parts, and is not as efficient as the present invention, i.e., approximately 50% of the input beam intensity is transformed into the output beam with the commonly owned U.S. Pat. No. 4,684,828 by Sommargren as compared to nominally 100% with the apparatus described herein.

As for the prior art use of a single Bragg cell in Dirksen, et al., op. cit., the frequency difference between the two orthogonally polarized components of the exit beam is twice the frequency of the acoustic beam. Starting with a higher frequency difference, the task of resolution extension becomes more difficult and expensive. Also with the single Bragg cell apparatus in Dirksen, et al., op. cit., the efficiency is limited to approximately 80% and there are significant non uniform intensity distributions across the two orthogonally polarized exit beam components in contrast to the present invention described herein. These non uniform intensity distributions across the width of the two orthogonally polarized exit beam components have a negative cross-correlation coefficient which further exacerbates the effect of non uniform beam component intensities for interferometry.

There is generally polarization mixing in both of the two exit beam components from the single Bragg cell apparatus of Dirksen et al., op. cit., since this apparatus uses the normal Bragg diffraction mode which limits its utility in precision interferometric measurements.

The single Bragg cell apparatus of Dirksen et al., op. cit., is also more complex requiring a minimum of two optical elements in addition to the Bragg cell and generates two desired and two undesired beam components which must be separated by external masks to occult the undesired beam components. There is more sensitivity to changes in temperature and temperature gradients because of multiple elements comprised of different materials and because of larger angles between the beam components inside the single Bragg cell apparatus of Dirksen et al., op. cit., in contrast to that found in the apparatus of the present invention described herein. The angles between the beam components inside the single Bragg cell apparatus of Dirksen et al., op. cit., are generally larger by design because in part Dirksen et al., op. cit., must spatially separate the desired and undesired beam components as a result of using normal Bragg diffraction in contrast to the present invention described herein which uses anisotropic Bragg diffraction.

The Dirksen et al., op. cit., single Bragg cell apparatus, which requires separation of parts, is sensitive to misalignment with additional sensitivity to thermal gradients. In addition, since the acoustic frequency for a single Bragg cell apparatus in Dirksen et al., op. cit., is one half of the frequency difference between the two orthogonally polarized components of the exit beam, the apparatus in Dirksen et al., op. cit., must operate at a lower acoustical frequency by a factor of two in relation to that for the apparatus of the present invention described herein to obtain a given frequency difference between the two orthogonally polarized components of the exit beam which leads to an additional reduction in efficiency.

As for the prior art use of two Bragg cells in apparatus of Dirksen et al., op. cit., the apparatus has more parts than the single Bragg cell apparatus of Dirksen et al., op. cit., which are well separated and require more space, there is generally polarization mixing in each of two exit beam components since the two Bragg cell apparatus of Dirksen et al., op. cit., uses normal Bragg diffraction mode, is sensitive to misalignment of the various parts, is more sensitive to thermal gradients in the apparatus as a result of multiple parts and the required separation of multiple parts, is not as efficient as the apparatus of the present invention described herein, i.e., approximately 60% to 80% of the input beam intensity is transformed into the output beam with the two Bragg cell apparatus of Dirksen et al., op. cit., as compared to nominally 100% with the apparatus described herein, generates two desired and either two or six undesired exit beam components depending on apparatus configuration selected, has increased non uniform intensity distributions across two orthogonally polarized exit beam components, the non uniform intensity distributions across widths of two orthogonally polarized exit beam components have negative cross-correlation coefficient which further exacerbates the effect of non uniform beam component intensities, and external masks are required to occult undesired beam components.

Finally, although the prior art use of two longitudinal modes of a randomly polarized HeNe laser provides a laser beam with two orthogonally polarized frequencies in a rather convenient, cost-effective form, the frequency difference is approximately 500–600 MHz which requires complicated, expensive detection and processing electronics. Furthermore, by starting out with such a high frequency difference, the task of resolution extension becomes difficult and expensive.

Some of the principal advantages of the present invention are that the apparatus: may be comprised of a single acousto-optical crystal with piezoelectric transducer bonded directly to the optical crystal, has high diffraction efficiency, has compact size requiring no external beam stops, has an efficiency of nominally 100% for conversion of input intensity into intensities of two orthogonally polarized exit beam components, and the intensity of each of two orthogonally polarized exit beam components may be adjusted to nominally 50% of the input intensity. In addition, the apparatus of the present invention can generate in a single Bragg diffraction two orthogonally polarized exit beam components. The apparatus of the present invention also exhibits reduced polarization mixing, has more uniform intensity distributions across two orthogonally polarized exit beam components, may have reduced lateral displacement between orthogonally polarized exit beam components, and may have lateral displacement between the orthogonally polarized exit beam components not effected by misalignment of multiple elements. Furthermore, the apparatus of the present invention has reduced angular displacement between orthogonally polarized beam components inside the acousto-optical crystal, which is made possible in part by the use of anisotropic Bragg diffraction in the present invention, and the angular displacement between orthogonally polarized exit beam components has reduced sensitivity to changes in temperature or to temperature gradients of the apparatus in part because of reduced angular displacement between orthogonally polarized beam components inside the acousto-optical crystal. The angular displacement between input and exit beams in the apparatus of the present invention has reduced sensitivity to changes in temperature or to temperature gradients of apparatus.

It is another object of this invention to provide apparatus for generating orthogonally polarized beams of different frequency with a predetermined angle of divergence between them and a predetermined lateral separation between their energy flux profiles.

It is yet another object of the present invention to provide apparatus for generating orthogonally polarized, parallel beams of different frequency that have energy flux profiles that are either partially coextensive or substantially coextensive.

Consequently, while prior art techniques for producing a laser beam with two optical frequencies of orthogonal polarization are useful for some applications, none known to applicant provide the technical performance in a commercially viable form for applications requiring the measurement of rapidly changing lengths (distances) to extremely high resolution. The afore-mentioned disadvantages of the prior art are overcome by the present invention.

BRIEF DESCRIPTION OF THE DRAWINGS

The structure, operation, and methodology of the invention, together with other objects and advantages thereof, may best be understood by reading the detailed description in connection with the drawings in which each part has an assigned numeral that identifies it wherever it appears in the various drawings and wherein:

FIG. 7c depicts in schematic form the detailed propagation of the light beams through the anisotropic acousto-optical crystal for the presently preferred second variant of the fifth embodiment of the present invention which uses one internal reflection and three refractions at surfaces of the birefringent acousto-optical crystal to render the output beams preferably parallel and coextensive;

SUMMARY OF THE INVENTION

Figure 1:
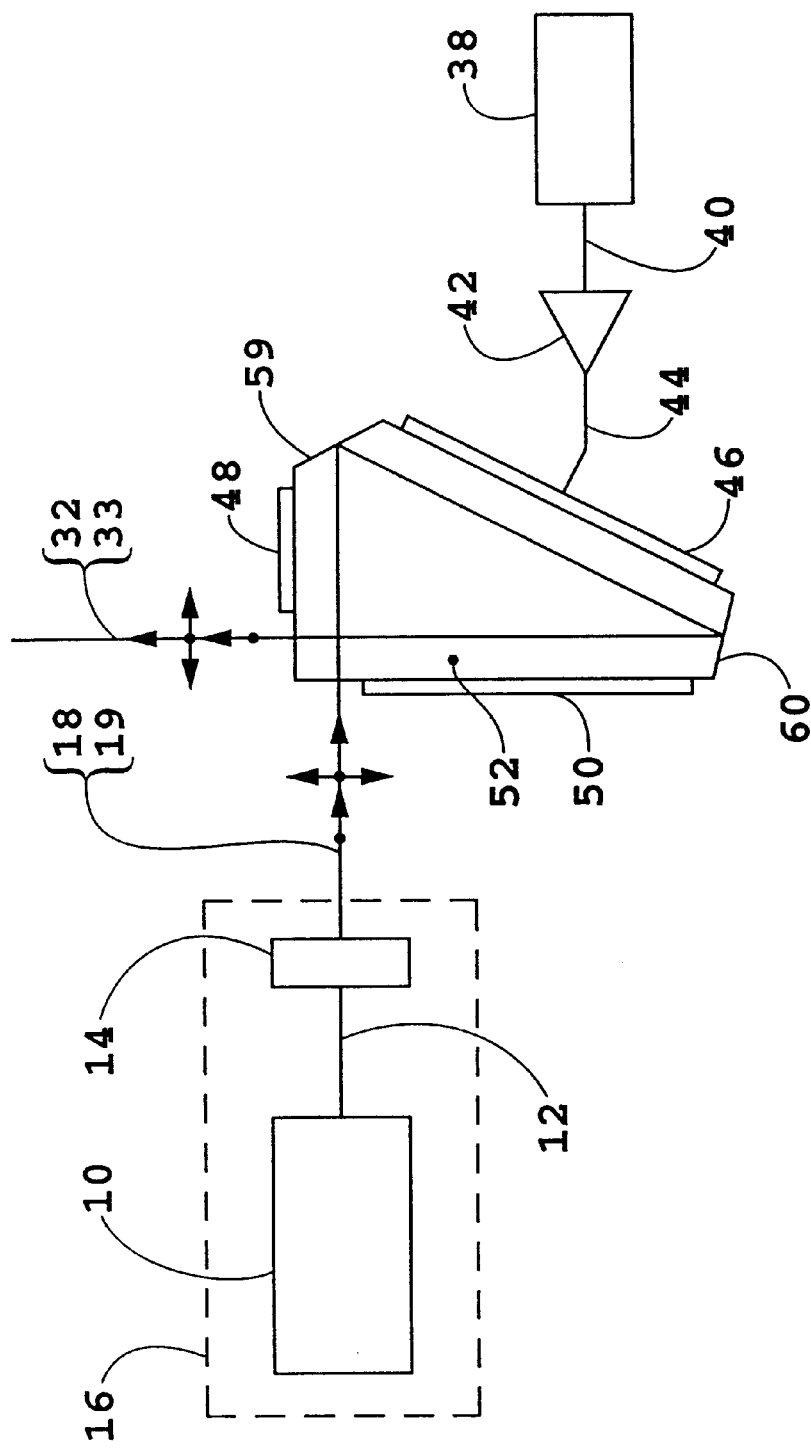
FIG. 1 depicts in schematic form the presently preferred structure by which the first and second embodiments of the present invention may be practiced, the difference between the first and second embodiments being related to the state of polarization of the input light beam, its angle of incidence at the entrance face, and its subsequent path within a multifaceted anisotropic acousto-optical crystal comprising the invention.

The present invention relates to apparatus for providing orthogonally polarized light beams for use in precision metrology applications such as in the measurement of length or length changes using interferometric techniques. The orthogonally polarized light beams are preferably parallel but may beneficially have a predetermined angle of divergence between them. A number of different embodiments of the invention are disclosed in the form of electro-optical devices for transforming a single-frequency, linearly polarized input beam from a light source, preferably a laser of frequency, $f_L$, into an output beam having two orthogonally polarized, preferably parallel output beam components differing in frequency from each other. The energy flux profiles of the output beam components may be spatially separated, partially coextensive, or substantially coextensive in accordance with the details of particular device embodiments. The input beam is introduced to a multifaceted anisotropic acousto-optical crystal for travel through an interactive region where it experiences an acoustic beam that diffracts it via small angle Bragg diffraction to form two orthogonally polarized internal beam components that are separated by a small angle of divergence and subsequently become external beam components available outside of the acousto-optical crystal for use in anticipated downstream applications.

In all of the embodiments, the multifaceted or multifaced anisotropic acousto-optical crystal having an optic axis, z, and a first facet that is nominally parallel to the optic axis. The acousto-optical crystal preferably is a uniaxial crystal comprising lithium niobate.

Transducer means, preferably in the form of a piezoelectric transducer, are affixed to the first acousto-optical crystal facet for generating an acoustic beam so that it propagates generally perpendicular to the optic axis to provide an interaction region within the optical crystal, where the width of the interaction region is generally coextensive with the width of the acoustic beam. The acoustic beam preferably is a shear wave.

The transducer is driven with an electrical signal at a frequency, $f_0$, from a frequency stabilized electronic oscillator and an electronic amplifier. The electrical signal is transformed to the acoustic shear wave via the transducer and propagates inside of the acousto-optical crystal to form the interactive region.

The polarization plane and angle of incidence of the input laser beam at an entrance facet of the acousto-optical crystal may be chosen so that the frequency of one of the external beam components may be higher or lower than the laser frequency, $f_L$, by the frequency of the oscillator, $f_0$.

The input laser beam is introduced into the acousto-optical crystal so that it propagates through the interaction region at least once with a predetermined portion of it converted by small angle Bragg diffraction to a diffracted beam The diffracted beam, which is derived from the initial input beam, is orthogonally polarized with respect to the input beam and altered in frequency by the frequency, $f_0$, of the oscillator. The remainder of the input beam and the diffracted beam continue to propagate through the anisotropic acousto-optical crystal along a path as slightly diverging orthogonally polarized emergent beams. Depending on the specific embodiment, the emergent beams are either intercepted within the acousto-optical crystal or outside of it to be rendered preferably parallel by collimating means. The collimating means can be in the form of internal reflecting and/or integral refracting surfaces and/or external birefringent or nonbirefringent elements. However, if desired, the external beams can be non-parallel such that they have a predetermined angle of divergence between them.

The degree of overlap or spatial separation between the energy flux profiles of the orthogonally polarized, external beam components is controlled by various internal reflecting and refracting properties of the acousto-optical crystal, its birefringence, the acoustical and optical properties of the acousto-optical crystal, the length of the physical path of travel experienced by the emergent beam components, and/or the use of external control elements. Thermal compensation may be provided via the use external phase retardation plates and principles of symmetry, and high diffraction efficiency may be achieved via the use of multiple pass arrangements through the interaction zone to reduce input power requirements.

DETAILED DESCRIPTION OF THE PREFERRED EMBODIMENTS

The present invention relates to apparatus for providing orthogonally polarized, light beams for use in precision metrology applications such as in the measurement of length or length changes using interferometric techniques. A number of different embodiments of the invention are disclosed in the form of electro-optical devices for transforming a single-frequency, linearly polarized input beam from a light source, preferably a laser of frequency, $f_L$, into an output beam having two orthogonally polarized, preferably parallel output beam components differing in frequency from each other. While the output beam components are preferably parallel, they need not be but instead may beneficially have a predetermined angle of divergence between them if desired. The energy flux profiles of the output beam components may be spatially separated, partially coextensive, or substantially coextensive in accordance with the details of particular device embodiments and the requirements of the metrology or other contemplated application. In addition, thermal compensation may be made available through the use of external phase retardation plates and the exploitation of the principles of symmetry, and power requirements may be reduced through the use of multiple pass arrangements through the interaction region of the anisotropic acousto-optical crystal. In the initial embodiments to be described, the output beam components may be spatially separated or partially coextensive depending on the details of the design while in the latter embodiments, the output beam components preferably are coextensive.

Referring to the drawings in detail, and initially to FIG. 1, FIG. 1 depicts, in schematic form, presently preferred structure by which the first and second embodiments of the apparatus for the present invention may be implemented. While the apparatus of the present invention has application for a wide range of radiation sources, the following description is taken, by way of example, with respect to an optical measuring system. The term "optical energy" as used herein includes, but is not limited to, electromagnetic energy of all frequency ranges.

In accordance with the first embodiment of the present invention, an acousto-optical apparatus is provided that is capable of transforming a linearly polarized input beam comprised of a single frequency component into an output beam comprised of two output beam components. The output beam components are linearly and orthogonally polarized, preferably have the same directions of propagation, and preferably are spatially separated but may have a spatial separation of approximately equal to or less than the diameter of the output beam components. One output beam component has the same frequency as the input beam, the second output beam component has a frequency different from that of the input beam, and the intensities of the two output beam components are substantially equal with the intensity of the output beam being substantially equal to the intensity of the input beam.

Figure 2A:
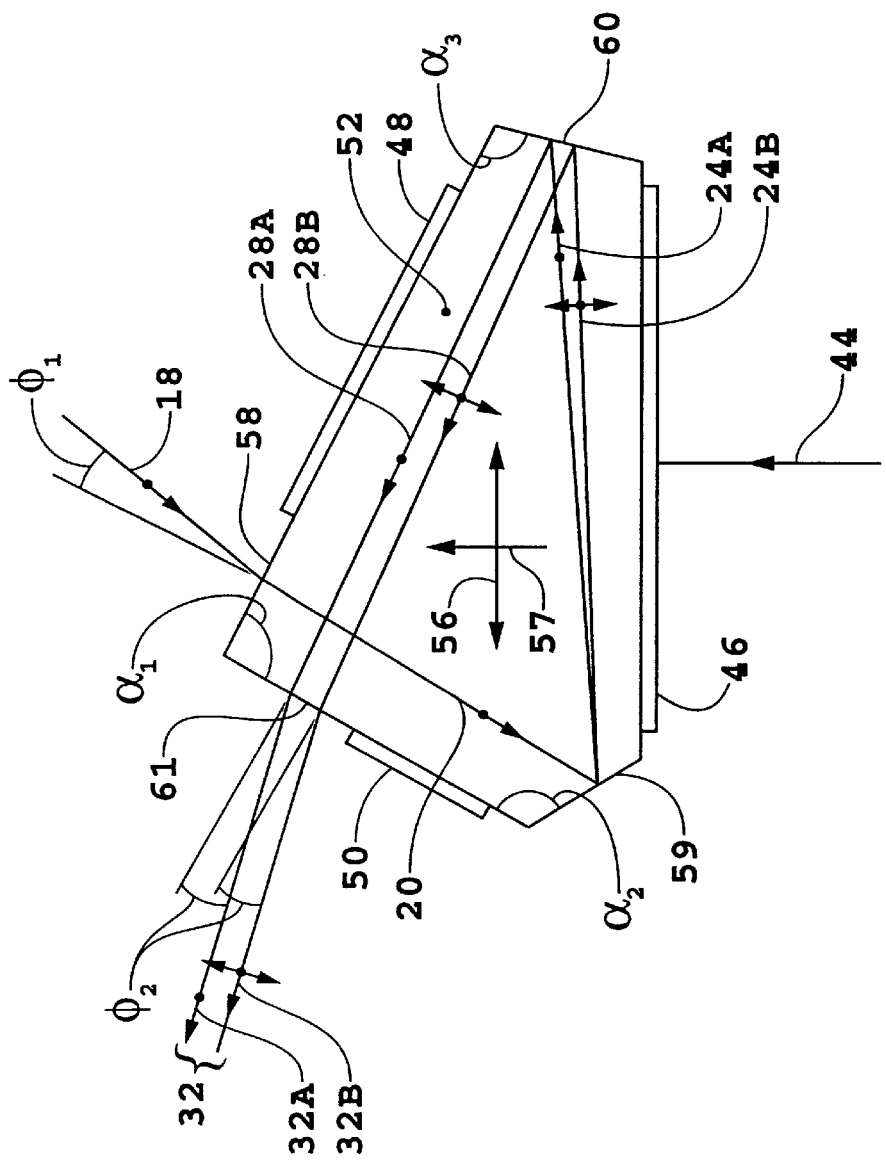
FIG. 2a depicts in schematic form the detailed propagation of the light beams through the anisotropic acousto-optical crystal (52) shown in FIG. 1 configured for use in the presently preferred first embodiment of the present invention such that the angle between the input beam (18) and the output beam (32) is an angle specified by the design of acousto-optical crystal (52) to be equal to approximately 90 degrees and substantially independent of small changes in the orientation of the acousto-optical crystal (52)

FIG. 2a depicts in schematic form the detailed propagation of an input beam (18) through an anisotropic acousto-optical crystal (52) such that the nominal angle between the input beam (18) and an output beam (32) is an angle specified by the design of the acousto-optical crystal (52) to be equal to approximately 90 degrees and substantially independent of small changes in the orientation of the acousto-optical crystal (52).

A light source (10), such as most preferably a laser, provides a beam (12) of optical energy which has a single, stabilized frequency and is linearly polarized. Light source (10) can be any of a variety of lasers. For example, it can be a gas laser, e.g. a HeNe, stabilized in any of a variety of conventional techniques known to those skilled in the art to produce beam (12), see for example, T. Baer et al., "Frequency stabilization of a 0.633 µm He—Ne-longitudinal Zeeman laser," *Applied Optics,* 19(18), 3173–3177 (1980); Burgwald et al., U.S. Pat. No. 3,889,207, issued Jun. 10, 1975; and Sandstrom et al., U.S. Pat. No. 3,662,279, issued May 9, 1972. Alternatively, light source (10) can be a diode laser frequency stabilized by one of a variety of conventional techniques known to those skilled in the art to produce beam (12), see for example, T. Okoshi and K. Kikuchi, "Frequency Stabilization of Semiconductor Lasers for Heterodyne-Type Optical Communication Systems," *Electronic Letters,* 16(5), 179–181 (1980) and S. Yamaqguchi and M. Suzuki, "Simultaneous Stabilization of the Frequency and Power of an AlGaAs Semiconductor Laser by Use of the Optogalvanic Effect of Krypton," *IEEE J. Quantum Electronics,* QE-19(10), 1514–1519 (1983).

The specific device used for source (10) will determine the diameter and divergence of beam (12). For some sources, e.g. a diode laser, it is necessary to use conventional beam shaping optics (14), e.g. a conventional microscope objective, to provide input beams (18) and (19) with suitable diameters and divergences for the elements that follow. When source (10) is a HeNe laser, for example, beam shaping optics (14) may not be required. The elements (10) and (14) are shown in dashed box (16) which represents the source of the input beams (18) and (19) and, for this embodiment and others with analogous features, includes well-known alignment means for spatially and angularly positioning input beams (18) and (19). Such alignment means could, for example, comprise precision micromanipulators and steering mirrors. The input beams (18) and (19) have the same stabilized frequency $f_L$ and are linearly polarized perpendicular to and parallel to the plane of FIG. 1, respectively.

An electrical oscillator (38) preferably provides a frequency stabilized electrical signal (40) of frequency $f_0$ to a conventional power amplifier (42). The electrical output (44) of the power amplifier (42) is preferably used to drive a conventional piezoelectric transducer (46) affixed to acousto-optical crystal (52). The piezoelectric transducer (46) is used to generate an acoustic beam which is preferably of the shear wave type. As is known to those skilled in the art of acousto-optical modulation, the acoustic shear wave may be conventionally generated with the piezoelectric transducer (46) affixed to acousto-optical crystal (52) as shown in FIG. 1 or by reflecting an appropriately directed longitudinal acoustic wave from an appropriately oriented surface of the acousto-optical crystal (52). Conventional techniques known to those skilled in the art of acousto-optical modulation are used to absorb, by absorbers (48) and (50), the acoustic beam that passes through to the walls of the acousto-optical crystal (52).

The preferred acousto-optical crystal (52) for the first embodiment is made of a uniaxial crystal (e.g., $LiNbO_3$) having an optical axis (56) in the plane of FIG. 2a which makes an angle φ (cf. FIG. 5) with a direction of propagation of the acoustic beam (57) generated by the piezoelectric transducer (46).

The schematic illustrated in FIG. 2a is for a conventional acousto-optical crystal (52) comprised of a negative uniaxial crystal. The input beam (18), such as illustrated in FIG. 2a for the first preferred embodiment, preferably enters the acousto-optical crystal (52) at surface (58) with an angle of incidence $\phi_1$, becoming an ordinarily polarized beam (20). Beam (20) is reflected from surface (59) becoming an ordinarily polarized beam (24A) propagating at an angle $\theta_i$ to the wave front surface of the acoustic beam (57). A particular value for angle $\theta_i$ is acquired through the selection of the angle of incidence $\phi_1$ and the apex angles $\alpha_1$ and $\alpha_2$ defined in FIG. 2a. Due to the photoelastic interaction of the beam (24A) with the acoustic beam (57) [see for example, R. W. Dixon, "Acoustic Diffraction of Light in Anisotropic Media," *IEEE Journal of Quantum Electronics,* QE-3(2), 85–93 (1967); A. Yariv and P. Yeh, *Optical Waves in Crystals* (Wiley, New York), Chap. 9, (1984)], an extraordinarily polarized beam (24B) is generated by Bragg diffraction when the following relationships are satisfied:

$$\sin\theta_i = \frac{\lambda_0}{2n_i v}\left[f_0 + \frac{v^2}{f_0\lambda_0^2}(n_i^2 - n_d^2)\right], \quad (1)$$

$$\sin\theta_d = \frac{\lambda_0}{2n_d v}\left[f_0 - \frac{v^2}{f_0\lambda_0^2}(n_i^2 - n_d^2)\right], \quad (2)$$

where the incident and diffracted beams are optical beams (24A) and (24B), respectively, $n_i$ and $n_d$ are the indices of refraction for the incident and diffracted beams, respectively, $\lambda_0$ is the optical wavelength in vacuum, and $v$ is the speed of acoustic beam (57). The angle $\theta_d$ is the angle between the diffracted optical beam (24B) and a normal to the acoustic momentum vector K, the acoustic momentum vector being parallel to (57). The definitions of positive $\theta_i$ and $\theta_d$ are illustrated in FIG. 5.

The index of refraction η for an extraordinarily polarized beam is given by the equation $$\frac{1}{n^2} = \frac{1}{n_o^2}\cos^2\theta + \frac{1}{n_e^2}\sin^2\theta \quad (3)$$

where the angle θ is the angle between the direction of propagation of an extraordinarily polarized beam and the optical axis (56) of the acousto-optical crystal (52) and $n_o$ and $n_e$ are ordinary and extraordinary principal indices of refraction of the acousto-optical crystal (52), respectively.

Figure 5:
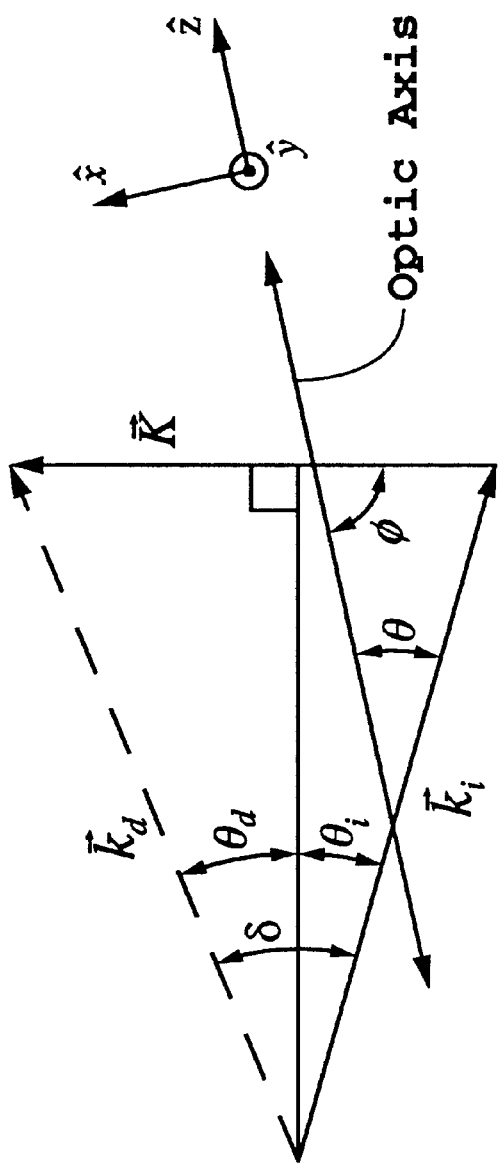
FIG. 5 depicts the optic axis of an uniaxial crystal and wavevector construction describing Bragg diffraction in a negative uniaxial crystal for use in the present invention when the incident optical beam is extraordinarily polarized at a frequency $f_L$ and the frequency of the diffracted beam is $f_L+f_0$, the wavefront vector of the input beam being $\kappa_i$ and that of the diffracted beam being $\kappa_d$.

The Bragg diffraction employed in the first and subsequent embodiments is classified as small angle Bragg diffraction where the angle between the direction of propagation of the incident light beam and the acoustic beam wave front is small (Refer to FIG. 5).

The extraordinarily polarized beam (243) propagates at an angle δ to the direction of propagation of the ordinarily polarized beam (24A) where δ, which is equal to $(\theta_i+\theta_d)$, is specified by the equation $$\sin\delta = \frac{\lambda_0}{n_i\Lambda}\cos\theta_d = \frac{\lambda_0}{n_d\Lambda}\cos\theta_i \quad (4)$$

and Λ is the wavelength of the acoustic beam in acousto-optical crystal (52). In addition, the frequency of the beam (24B) is $f_L-f_0$ while the frequency of the ordinarily polarized beam (24A) is $f_L$. The polarization of the beam (24B) is orthogonal to that of the ordinarily polarized beam (24A). The two beams (24A) and (24B) are reflected from crystal face (60) as beams (28A) and (28B), respectively. The beams (28A) and (28B) preferably exit the acousto-optical crystal (52) at surface (61) as output beam (32) comprised of components (32A) and (32B), respectively.

The respective angles of incidence and reflection for beams (24A), (24B), (28A), and (28B) at surface (60) and the respective angles incidence and refraction for beams (28A) (28B), (32A), and (32B) at surface (61) are chosen, utilizing properties of refraction by and internal reflection in birefringent crystals, such that beam components (32A) and (32B) preferably have parallel directions of propagation. The condition with respect to the relative directions of propagation of beam components (32A) and (32B) is obtained by choosing the apex angles $\alpha_1$ and $\alpha_3$ and the angle of refraction $\phi_2$ such that $$\delta = (\alpha_1 + \alpha_3 - \pi) - \sin^{-1}\left(\frac{\sin\phi_2}{n_o}\right) - \sin^{-1}\left\{\frac{n_{4,e}}{n'_{4,e}}\sin\left[(\alpha_1 + \alpha_3 - \pi) - \sin^{-1}\left(\frac{\sin\phi_2}{(n')_{3,e}}\right)\right]\right\} \quad (5)$$

where apex angles $\alpha_1$ and $\alpha_3$ and the angle of refraction $\phi_2$ are defined in FIG. 2a, $n'_{3,e}$=$n_{4,e}$ are the indices of refraction for beam (28B) at surfaces (61) and (60), respectively, $n'_{4,e}$ is the index of refraction for beam (24B) at surface (60), and $\delta$ is given by Eq. (4). Clearly, if it is desired to have the beam components (32A) and (32B) be non-parallel, i.e. $\phi_2$ for beam component (32A) not the same as $\phi_2$ for beam component (32B), then the values of the parameters of Eq. (5) may be chosen so that beams (32A) and (32B) have a predetermined angle of divergence between them.

Preferably, the electrical output (44) of the power amplifier (42) is adjusted so that intensity of output beam component (32A) relative to the intensity of the input beam (18) is some preselected nominal value between 0% and 100%, preferably 50%. The intensity of output beam (32) is approximately 100% of the input beam (18) intensity. Consequently, the output beam (32) is comprised of the two beam components (32A) and (32B) which are parallel, orthogonally polarized, and differ in frequency by $f_0$, while substantially 100% of the input beam (18) intensity is transformed into the intensity of output beam (32).

The energy flux profiles for beam components (32A) and (32B) are preferably spatially displaced one relative to the other, but may be made to be coextensive. The degree of coextensiveness of the energy flux profiles of the orthogonally polarized external beams varies substantially in accordance with the birefringence and acoustical and optical properties of said anisotropic acousto-optical crystal, the physical path length over which said emergent beams travel prior to being collimated, and the value of the predetermined driving frequency, $f_0$, and may be made to be an amount which is typically of the order of or less than the diameter of beam components (32A) and (32B). For purposes of illustration, this displacement is shown exaggerated in FIG. 2a. Consequently, the degree of spatial displacement between beam components (32A) and (32B) is set by the values of parameters such as the magnitude of the acoustic beam frequency $f_0$, the magnitude of the coupling coefficient for the photoelastic interaction, and the optical properties of the acousto-optical crystal (52).

The primary contributions to the spatial separation between energy flux profiles of output beam components (32A) and (32B) are the spatial separation resulting from the different directions of propagation of beams (24A) and (24B) and of beams (28A) and (28B) in acousto-optical crystal (52) and the spatial separation resulting from the deviation of the energy flux vector from the wave front vector for an extraordinarily polarized optical beam propagating in a birefringent crystal, a well known property of birefringent crystals. For acoustic beam frequencies $f_0$ of approximately a Ghz, the difference in directions of propagation $\delta$ of the incident and diffracted beams (24A) and (24B) produces the primary contribution to the spatial separation of output beam components (32A) and (32B) while for acoustic beam frequencies $f_0$ of, for example, approximately 20 Mhz, the deviation of the energy flux vector from the wave front vector for an optical beam propagating in a birefringent crystal produces the primary contribution to the spatial separation of output beam components (32A) and (32B).

The deviation of the energy flux vector from the wave front vector of an extraordinarily polarized beam produces an increase or decrease, as the case may be, in a displacement of a beam's energy flux profile from the path of the beam's optical wave front vector as the beam propagates through a birefringent crystal. For the acousto-optical apparatus of the present invention, the angle r between the energy flux vector of an extraordinarily polarized beam and the optical axis is $$\tan r = \frac{n_o^2}{n_e^2}\tan\theta \quad (6)$$

[cf. Section 7 of Chapter 10 by J. Bennett and H. Bennett, "Double Refraction in Calcite," *Handbook of Optics* (McGraw-Hill, New York) 1978]. By mathematical manipulation of Eq. (6), the tangent of the quantity of interest, (r−θ), can be expressed as $$\tan(r-\theta) = \left[\left(\frac{n_o}{n_e}\right)^2 - 1\right]\left[1 + \left(\frac{n_o}{n_e}\right)^2\tan^2\theta\right]^{-1}\tan\theta. \quad (7)$$

The spatial deviation of the energy flux profile from the path of the wave front vector for an extraordinarily polarized optical beam is to first order proportional to the product of θ, cf. Eq. (7), and the physical path length of the extraordinarily polarized optical beam in a birefringent crystal. Therefore, the contribution to the spatial separation of two orthogonally polarized beams propagating in a birefringent crystal, one being ordinarily polarized and the second being extraordinarily polarized, can in general be reduced by reducing the magnitude of the θ of the extraordinarily polarized beam and/or the physical path length of the extraordinarily polarized optical beam in the birefringent crystal.

The magnitude of θ for a specific extraordinarily polarized optical beam in a birefringent crystal is specified primarily by the configuration of acousto-optical crystal (52) designed in part such that Eq. (5) is satisfied. Thus, the resulting magnitude of respective θ's for the extraordinarily polarized optical beams (24B) and (28B) are generally reduced when δ is reduced. It is evident from Eq. (4) that the angle δ can be reduced by selecting birefringent materials with the larger indices of refraction and operating with a larger acoustic beam wavelength Λ. The acoustic beam wavelength Λ can be increased, for example, through the selection of birefringent materials for the acousto-optical crystal (52) which have higher speeds for acoustic beams of the longitudinal and shear wave type, by operating at lower acoustic beam frequencies, and by the use of an acoustic longitudinal wave rather than an acoustic shear wave, the speed of an acoustic shear wave generally being less than the speed of an acoustic longitudinal wave.

The efficiency of Bragg diffraction is reduced when a momentum matching condition is not maintained for a change in the angle $\theta_i$ of the incident beam (24A) and/or a change in the direction of propagation of the acoustic beam (57) according to subsequently set fourth Eq. (28). For an acousto-optical modulator, it is also preferable that the variation in $\theta_d$ within the output beam component (32B) not be substantially different from the variation in $\theta_i$ within the incident beam (24A). From the derivative with respect to $\theta_i$ of sinδ given by Eq. (4) and noting that $\delta = \theta_i + \theta_d$, an equation for the ratio of the differential change in $\theta_d$ required to match a differential change in $\theta_i$ can be obtained with the result $$\frac{d\theta_d}{d\theta_i} = -\frac{1}{1 + \tan\delta\tan\theta_d}. \tag{8}$$

It is evident from Eq. (8) that $|d\theta_d/d\theta_i| \cong 1$ in general for small angle Bragg diffraction where $\theta_i$ is small, such as is the case for the first preferred embodiment, and δ<1. With respect to the condition that δ<1, consider the example of an acoustic beam shear wave propagating in the acousto-optical crystal (52) made of LiNbO$_3$, λ=0.633 μm, and $f_0$=20 Mhz for which $\delta=1.12\times10^{-3}$ radians. Thus, the preferred operating condition where the variation in $\theta_d$ within the output beam component (32B) is not be substantially different from the variation in $\theta_i$ within the incident beam (24A) is available for the first described embodiment of the present invention, with the same property with respect to ($d\theta_d/d\theta_i$) existing for subsequently described embodiments which are all based on small angle Bragg diffraction.

In accordance with a second embodiment of the present invention, an acousto-optical apparatus is provided that is capable of transforming a linearly polarized input beam comprised of a single frequency component into an output beam comprised of two output beam components. The input beam is orthogonally polarized to the input beam of the first embodiment, the output beam components are linearly and orthogonally polarized, preferably have the same directions of propagation, and preferably have a spatial separation, but may be coextensive to an amount of approximately equal to or less than the diameter of the output beam components. The intensity of the two output beam components are substantially equal, the intensity of the output beam being substantially equal to the intensity of the input beam. One output beam component has the same frequency as the input beam, and the second output beam component has a frequency different from the input beam and different from the frequencies of the output beam components of the first embodiment.

Figure 2B:
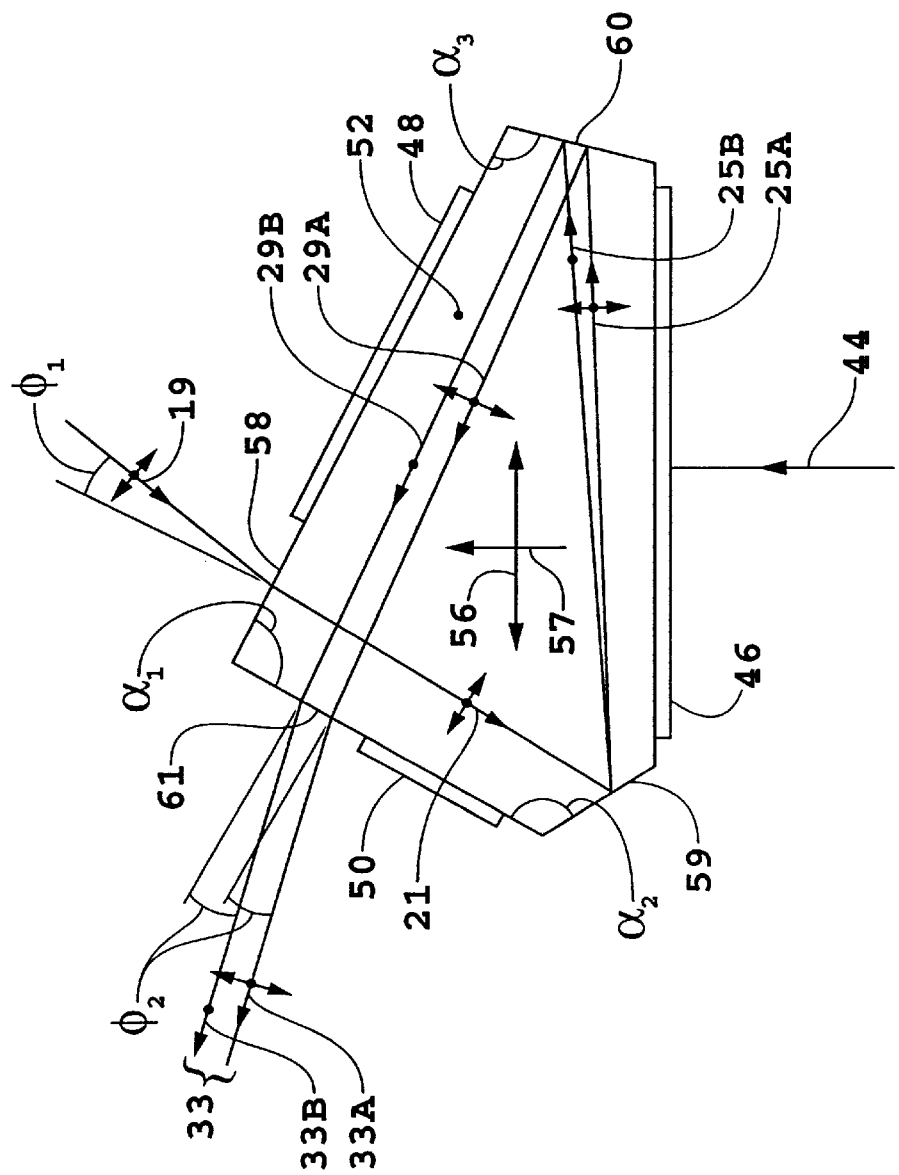
FIG. 2b depicts in schematic form the detailed propagation of the light beams through the anisotropic acousto-optical crystal (52) shown in FIG. 1 configured for use in the presently preferred second embodiment of the present invention such that the angle between the input beam (19) and the output beam (33) is an angle specified by the design of the acousto-optical crystal (52) to be equal to approximately 90 degrees and substantially independent of small changes in the orientation of the acousto-optical crystal (52)

The second embodiment is comprised of source (16), the oscillator (38), the power amplifier (42), and the acousto-optical crystal (52) of the first embodiment and uses input beam (19). The detailed propagation of input beam (19) through acousto-optical crystal (52) is illustrated in FIG. 2b such that the nominal angle between the input beam (19) and the output beam (33) comprised of output beam components (33A) and (33B) is an angle specified by the design of the acousto-optical crystal (52) to be equal to approximately 90 degrees and substantially independent of small changes in the orientation of acousto-optical crystal (52). The input beam (19) preferably enters acousto-optical crystal (52) at surface (58), becoming an extraordinarily polarized beam (21). Beam (21) is reflected from surface (59) becoming an extraordinarily polarized beam (25A) propagating at a small angle $\theta_i$ to the wave front surface of the acoustic beam (57). Due to the photoelastic interaction of beam (25A) with acoustic beam (57), an ordinarily polarized beam (25B) is generated by Bragg diffraction when the relationships given by Eqs. (1) and (2) are satisfied. The frequency of the beam (25B) is $f_L+f_0$ while the frequency of the ordinarily polarized beam (25A) is $f_L$.

The respective angles of incidence and reflection for beams (25A), (25B), (29A), and (29B) at surface (60) and the respective angles incidence and refraction for beams (29A), (29B), (33A), and (33B) at surface (61) are chosen, utilizing properties of refraction by and internal reflection in birefringent crystals, such that beam components (33A) and (33B) preferably have parallel directions of propagation. The condition with respect to the relative directions of propagation of beam components (33A) and (33B) is obtained by choosing the apex angles $\alpha_1$ and $\alpha_3$ and the angle of refraction $\phi_2$ such that $$\delta = (\alpha_1 + \alpha_3 - \pi) - \sin^{-1}\left(\frac{\sin\phi_2}{n_o}\right) - \tag{9}$$

$$\sin^{-1}\left\{\frac{n_{4,e}}{n'_{4,e}}\sin\left[(\alpha_1 + \alpha_3 - \pi) - \sin^{-1}\left(\frac{\sin\phi_2}{n'_{3,e}}\right)\right]\right\}$$

where apex angles $\alpha_1$ and $\alpha_3$ and the angle of refraction $\phi_2$ are defined in FIG. 2b, $n'_{3,e}=n_{4,e}$ are the indices of refraction for beams (29A) at surfaces (61) and (60), respectively, $n'_{4,e}$ is the index of refraction for beam (25A) at surface (60), and δ is given by Eq. (4). Again, if it is desired to have the beam components (33A) and (33B) be non-parallel, i.e. $\phi_2$ for beam component (33A) not the same as $\phi_2$ for beam component (33B), then the values of the parameters of Eq. (10) may be chosen so that beams (33A) and (33B) have a predetermined angle of divergence between them. The remainder of the description of the second embodiment is the same as the corresponding portion of the description presented for the first embodiment.

Figure 3A:
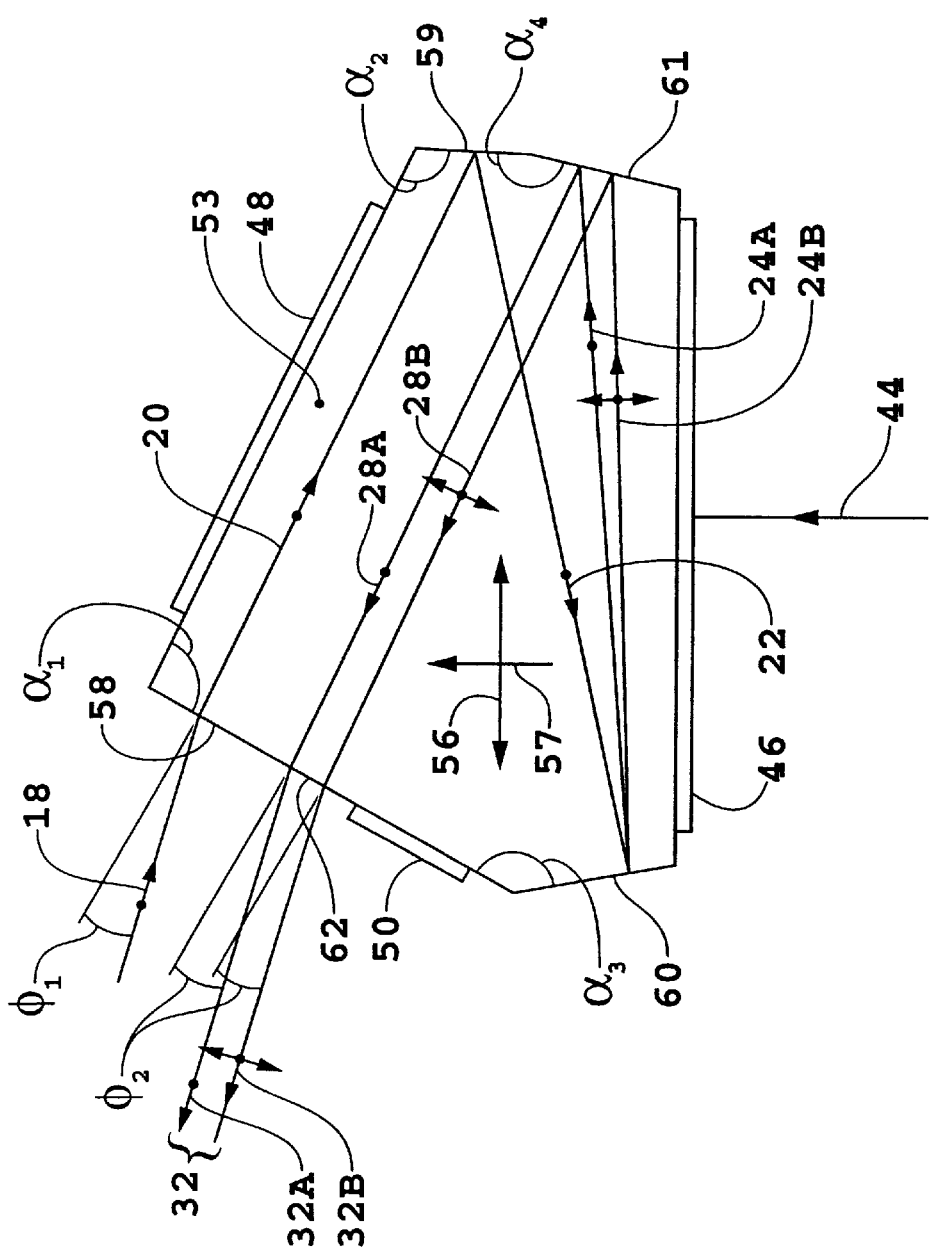
FIG. 3a depicts in schematic form the detailed propagation of the light beams through anisotropic acousto-optical crystal (53) configured for use in the presently preferred first variant of the first embodiment of the present invention such that the angle between the input beam (1) and the output beam (32) is an angle specified by the design of the acousto-optical crystal (53) to be equal to approximately 180 degrees.

In accordance with a first variant of the first embodiment of the present invention, an acousto-optical apparatus is provided that is capable of transforming a linearly polarized input beam, the same as used in the first embodiment, into an output beam comprised of two output beam components, the output beam components having the same properties as the output beam components of the first embodiment except the angle between the output beam and the input beam is equal to approximately 180 degrees. The first variant of the first embodiment is comprised of source (16), the oscillator (38), and the power amplifier (42) of the first embodiment and the acousto-optical crystal (53) as shown in FIG. 3a. FIG. 3a depicts in schematic form the detailed propagation of the input beam (18) through the acousto-optical crystal (53) such that the nominal angle between the input beam (18) and the output beam (32) comprised of output beam components (32A) and (32B) is an angle equal to approximately 180 degrees.

The respective angles of incidence and reflection for beams (24A), (24B), (28A), and (28B) at surface (61) and the respective angles incidence and refraction for beams (28A), (28B), (32A), and (32B) at surface (62) are chosen, utilizing properties of refraction by and internal reflection in birefringent crystals, such that-beam components (32A) and (32B) preferably have parallel directions of propagation The condition with respect to the relative directions of propagation of beam components (32A) and (32B) is obtained by choosing the apex angles $\alpha_1$, $\alpha_2$ and $\alpha_4$ and the angle of refraction $\phi_2$ such that $$\delta = (\alpha_1 + \alpha_2 + \alpha_4 - 2\pi) - \sin^{-1}\left(\frac{\sin\phi_2}{n_o}\right) - \sin^{-1}\left\{\frac{n_{4,e}}{n'_{4,e}}\sin\left[(\alpha_1 + \alpha_2 + \alpha_4 - 2\pi) - \sin^{-1}\left(\frac{\sin\phi_2}{n'_{3,e}}\right)\right]\right\} \quad (10)$$

where apex angles $\alpha_1$, $\alpha_2$, and $\alpha_4$ and the angle of refraction $\phi_2$ are defined in FIG. 3a, $n'_{3,e} = n_{4,e}$ are the indices of refraction for beam (28B) at surfaces (62) and (61), respectively, $n'_{4,e}$ is the index of refraction for beam (24B) at surface (61), and $\delta$ is given by Eq. (4). Also, if it is desired to have the beam components (32A) and (32B) be non-parallel, i.e. $\phi_2$ for beam component (32A) not the same as $\phi_2$ for beam component (32B), then the values of the parameters of Eq. (10) may be chosen so that beams (32A) and (32B) have a predetermined angle of divergence between them. The remainder of the description of the first variant of the first embodiment is the same as corresponding portions of the description presented for the first embodiment.

Figure 3B:
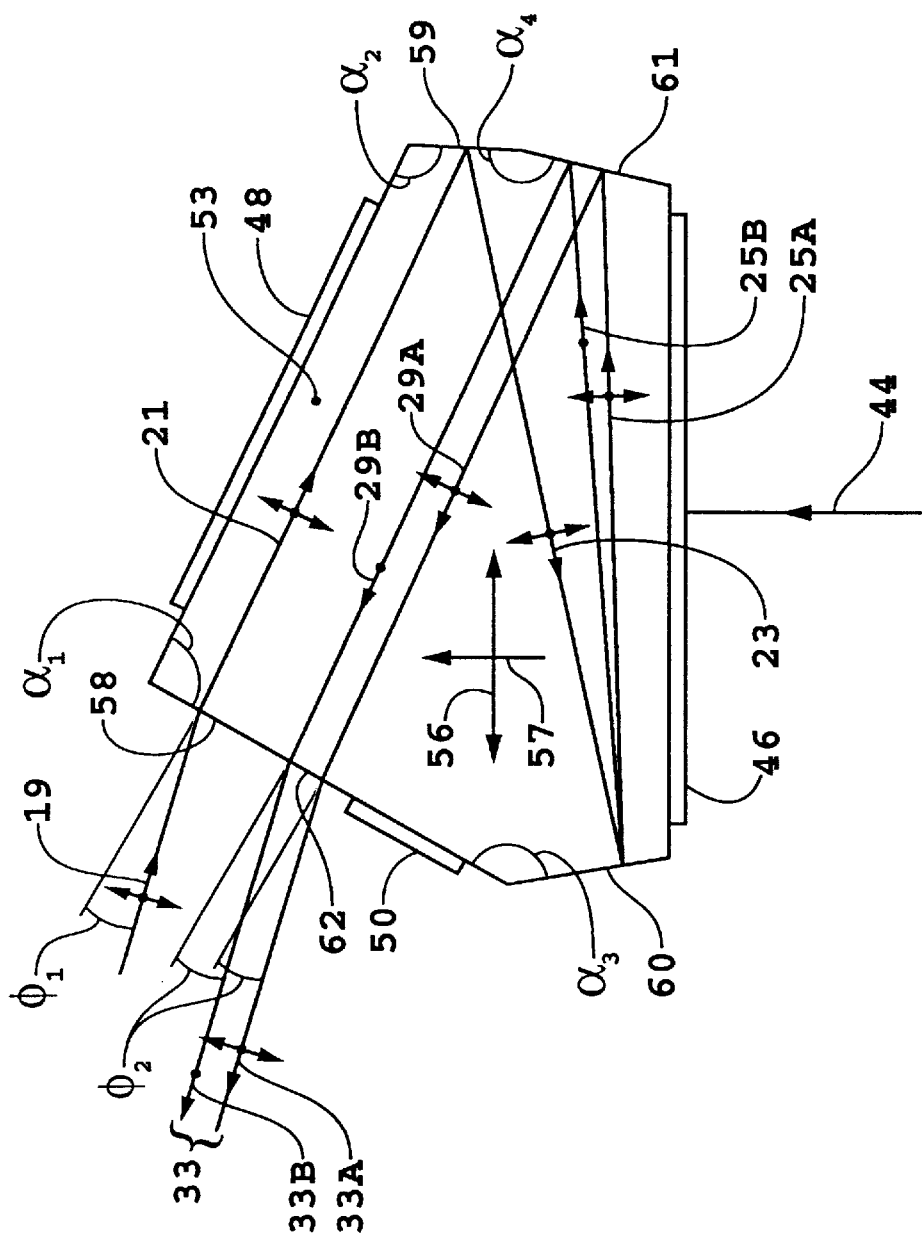
FIG. 3b depicts in schematic form the detailed propagation of the light beams through anisotropic acousto-optical crystal (53) configured for use in the presently preferred first variant of the second embodiment of the present invention such that the angle between the input beam (19) and the output beam (33) is an angle specified by the design of the acousto-optical crystal (53) to be equal to approximately 180 degrees.

Referring now to FIG. 3b, there is shown the acousto-optical crystal of a first variant of the second embodiment of the present invention. Here, an acousto-optical apparatus is provided that is capable of transforming a linearly polarized input beam, the same as used in the second embodiment, into an output beam comprised of two output beam components, the output beam components having the same properties as the output beam components of the second embodiment except the angle between the output beam and the input beam is equal to approximately 180 degrees. The first variant of the second embodiment is comprised of source (16), the oscillator (38), power amplifier (42) of the second embodiment and the acousto-optical crystal (53) as shown in FIG. 3b. FIG. 3b also depicts in schematic form the detailed propagation of the input beam (19) through the acousto-optical crystal (53) such that the nominal angle between the input beam (19) and the output beam (33) comprised of output beam components (33A) and (33B) is an angle equal to approximately 180 degrees.

The respective angles of incidence and reflection for beams (25A), (25B), (29A), and (29B) at surface (61) and the respective angles incidence and refraction for beams (29A), (29B), (33A), and (33B) at surface (62) are chosen, utilizing properties of refraction by and internal reflection in birefringent crystals, such that beam components (33A) and (33B) preferably have parallel directions of propagation. The condition with respect to the relative directions of propagation of beam components (33A) and (33B) is obtained by choosing the apex angles $\alpha_1$, $\alpha_2$, and $\alpha_4$ and the angle of refraction $\phi_2$ such that $$\delta = (\alpha_1 + \alpha_2 + \alpha_4 - 2\pi) - \sin^{-1}\left(\frac{\sin\phi_2}{n_o}\right) - \sin^{-1}\left\{\frac{n_{4,e}}{n'_{4,e}}\sin\left[(\alpha_1 + \alpha_2 + \alpha_4 - 2\pi) - \sin^{-1}\left(\frac{\sin\phi_2}{n'_{3,e}}\right)\right]\right\} \quad (11)$$

where apex angles $\alpha_1$, $\alpha_2$, and $\alpha_4$ and the angle of refraction $\phi_2$ are defined in FIG. 3b, $n'_{3,e} = n_{4,e}$ are the indices of refraction for beam (29A) at surfaces (62) and (61), respectively, $n'_{4,e}$ is the index of refraction for beam (25A) at surface (61), and $\delta$ is given by Eq. (4). Again, if it is desired to have the beam components (33A) and (33B) be non-parallel, i.e. $\phi_2$ for beam component (33A) not the same as $\phi_2$ for beam component (33B), then the values of the parameters of Equation (12) may be chosen so that beams (33A) and (33B) have a predetermined angle of divergence between them. The remainder of the description of the first variant of the second embodiment is the same as corresponding portions of the description presented for the second embodiment.

Figure 4A:
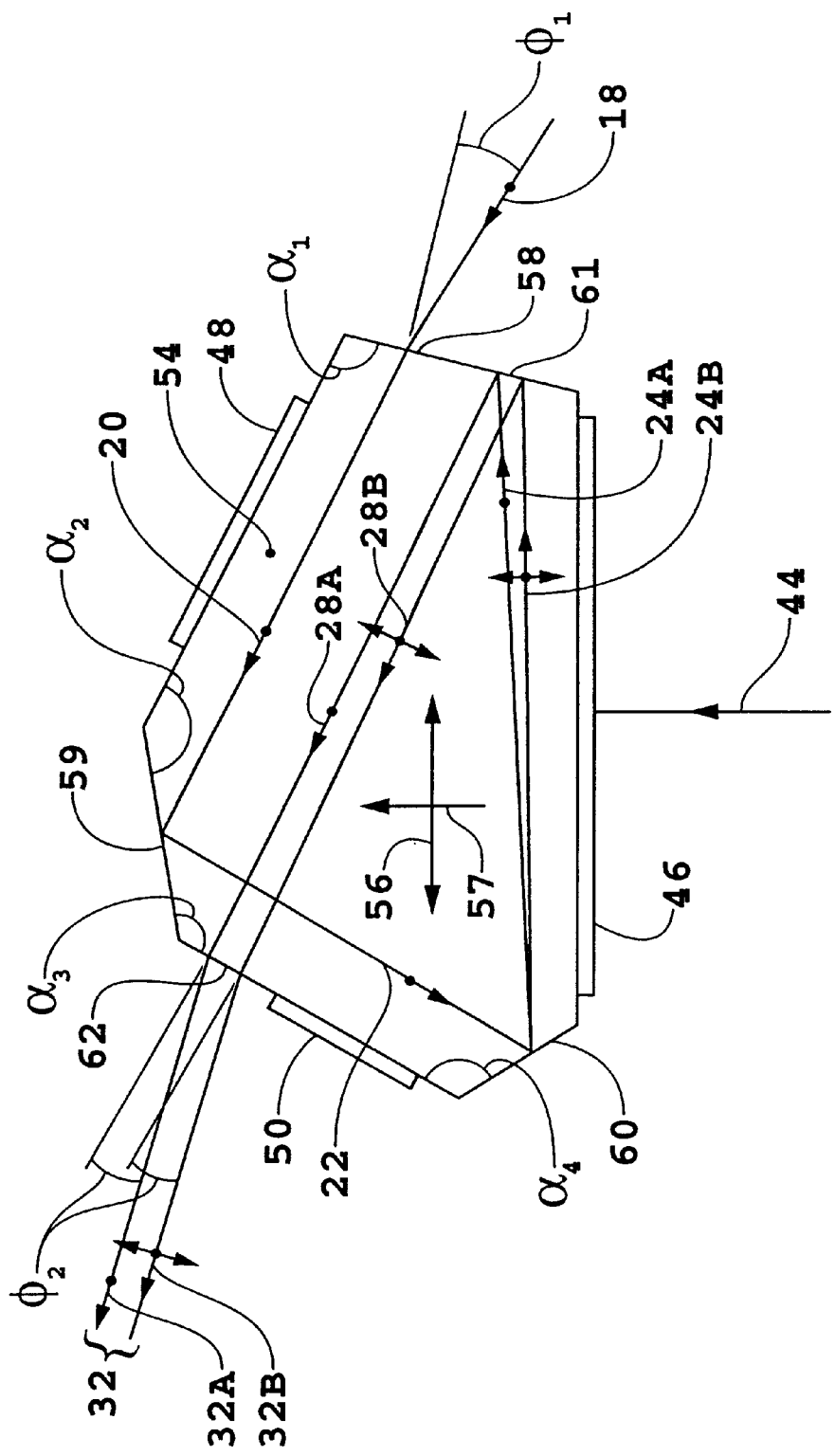
FIG. 4a depicts in schematic form the detailed propagation of the light beams through the anisotropic acousto-optical crystal (54) configured for use in the presently preferred second variant of the first embodiment such that the angle between the input beam (18) and the output beam (32) is an angle specified by the design of the acousto-optical crystal (54) to be equal to approximately 360 degrees.

In accordance with a second variant of the first embodiment of the present invention, an acousto-optical apparatus is provided that is capable of transforming a linearly polarized input beam, the same as used in the first embodiment, into an output beam comprised of two output beam components. The output beam components have the same properties as the output beam components of the first embodiment except the angle between the output beam and the input beam is equal to approximately 360 degrees. The second variant is comprised of source (16), the oscillator (38) and power amplifier (42) of the first embodiment and the acousto-optical crystal (54) shown in FIG. 4a. FIG. 4a depicts in schematic form the detailed propagation of the input beam (18) through the acousto-optical crystal (54) such that the nominal angle between the input beam (18) and the output beam (32) comprised of output beam components (32A) and (32B) is an angle equal to approximately 360 degrees.

The respective angles of incidence and reflection for beams (24A), (24B), (28A), and (28B) at surface (61) and the respective angles incidence and refraction for beams (28A), (28B), (32A), and (32B) at surface (62) are chosen, utilizing properties of refraction by and internal reflection in birefringent crystals, such that beam components (32A) and (32B) preferably have parallel directions of propagation. The condition with respect to the relative directions of propagation of beam components (32A) and (32B) is obtained by choosing the apex angles $\alpha_1$, $\alpha_2$, and $\alpha_3$ and the angle of refraction $\phi_2$ such that $$\delta = (\alpha_1 + \alpha_2 + \alpha_3 - 2\pi) - \sin^{-1}\left(\frac{\sin\phi_2}{n_o}\right) - \sin^{-1}\left\{\frac{n_{4,e}}{n'_{4,e}}\sin\left[(\alpha_1 + \alpha_2 + \alpha_3 - 2\pi) - \sin^{-1}\left(\frac{\sin\phi_2}{n'_{3,e}}\right)\right]\right\} \quad (12)$$

where apex angles $\alpha_1$, $\alpha_2$, and $\alpha_3$ and the angle of refraction $\phi_2$ are defined in FIG. 4a, $n'_{3,e} = n_{4,e}$ are the indices of refraction for beam (28B) at surfaces (62) and (61) respectively, $n'_{4,e}$ is the index of refraction for beam (24B) at surface (61), and $\delta$ is given by Eq. (4). Further, if it is desired to have the beam components (32A) and (32B) be non-parallel, i.e. $\phi_2$ for beam component (32A) not the same as $\phi_2$ for beam component (32B), then the values of the parameters of Equation (12) may be chosen so that beams (32A) and (32B) have a predetermined angle of divergence between them. The remainder of the description of the second variant of the first embodiment is the same as corresponding portions of the description presented for the first embodiment.

Figure 4B:
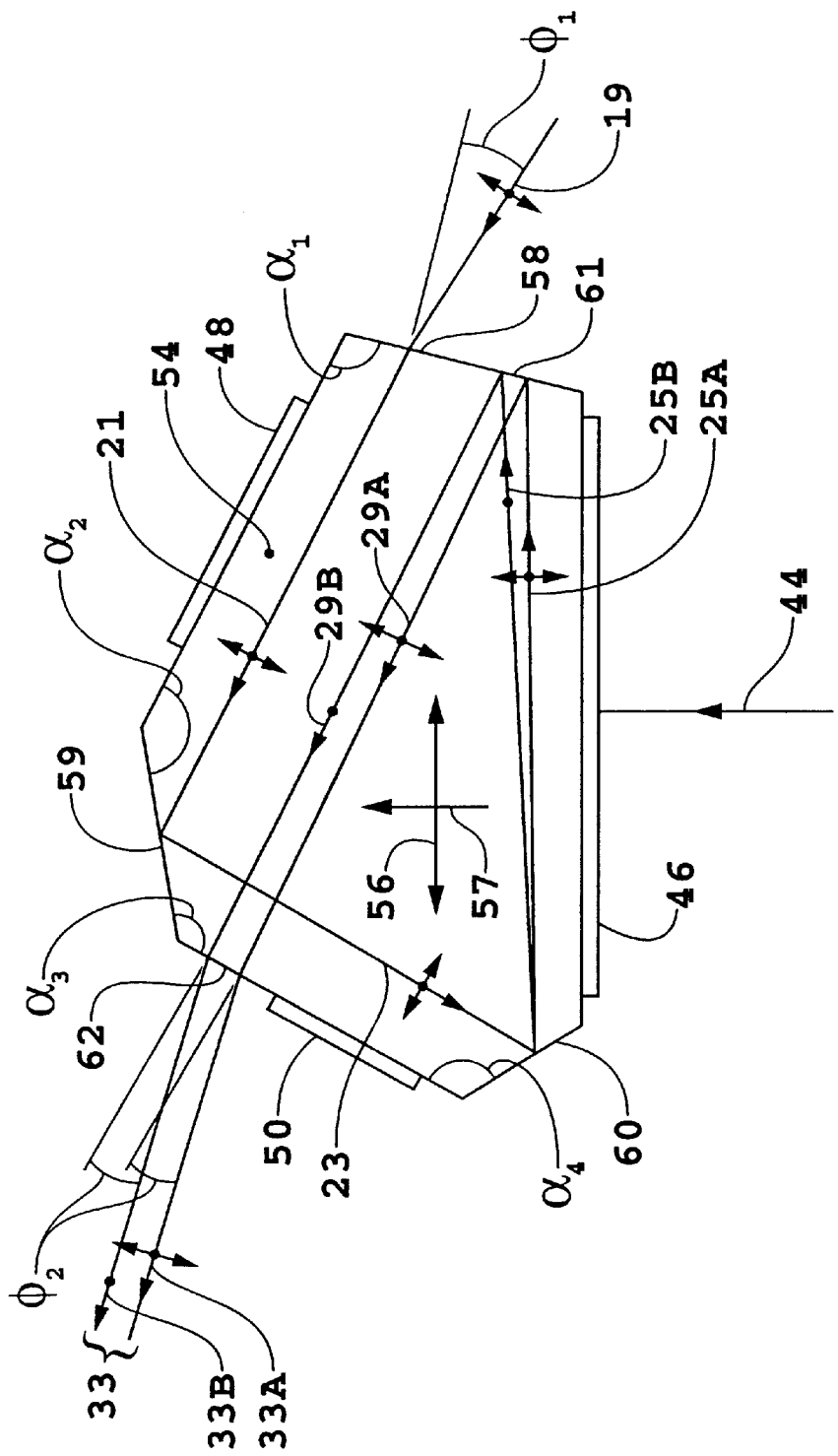
FIG. 4b depicts in schematic form the detailed propagation of the light beams through the anisotropic acousto-optical crystal (54) configured for use in the presently preferred second variant of the second embodiment such that the angle between the input beam (19) and the output beam (33) is an angle specified by the design of the acousto-optical crystal (54) to be equal to approximately 360 degrees.

In accordance with a second variant of the second embodiment of the present invention, an acousto-optical apparatus is provided that is capable of transforming a linearly polarized input beam, the same as used in the second embodiment, into an output beam comprised of two output beam components. The output beam components have the same properties as the output beam components of the second embodiment except the angle between the output beam and the input beam is equal to approximately 360 degrees. The second variant of the second embodiment is comprised of source (16), the oscillator (38), and power amplifier (42) of the second embodiment and the acousto-optical crystal (54) shown in FIG. 4b. FIG. 4b also depicts in schematic form the detailed propagation of the input beam (19) through the acousto-optical crystal (54) such that the nominal angle between the input beam (19) and the output beam (33) comprised of output beam components (33A) and (33B) is an angle equal to approximately 360 degrees.

The respective angles of incidence and reflection for beams (25A), (25B), (29A), and (29B) at surface (61) and the respective angles incidence and refraction for beams (29A), (29B), (33A), and (33B) at surface (62) are chosen, utilizing properties of refraction by and internal reflection in birefringent crystals, such that beam components (33A) and (33B) preferably have parallel directions of propagation. The condition with respect to the relative directions of propagation of beam components (33A) and (33B) is obtained by choosing the apex angles $\alpha_1$, $\alpha_2$, and $\alpha_3$ and the angle of refraction $\phi_2$ such that $$\delta = (\alpha_1 + \alpha_2 + \alpha_3 - 2\pi) - \sin^{-1}\left(\frac{\sin\phi_2}{n_o}\right) - \quad (13)$$
$$\sin^{-1}\left\{\frac{n_{4,e}}{n'_{4,e}}\sin\left[(\alpha_1 + \alpha_2 + \alpha_3 - 2\pi) - \sin^{-1}\left(\frac{\sin\phi_2}{n'_{3,e}}\right)\right]\right\}$$

where apex angles $\alpha_1$, $\alpha_2$, and $\alpha_3$ and the angle of refraction $\phi_2$ are defined in FIG. 4b, $n'_{3,e} = n_{4,e}$ are the indices of refraction for beam (29A) at surfaces (62) and (61), respectively, $n'_{4,e}$ is the index of refraction for beam (25A) at surface (61), and $\delta$ is given by Eq. (4). Again, if it is desired to have the beam components (33A) and (33B) be non-parallel, i.e. $\phi_2$ for beam component (33A) not the same as $\phi_2$ for beam component (33B), then the values of the parameters of Equation (13) may be chosen so that beams (33A) and (33B) have a predetermined angle of divergence between them. The remainder of the description of the second variant of the second embodiment is the same as corresponding portions of the description presented for the second embodiment.

Figure 6A:
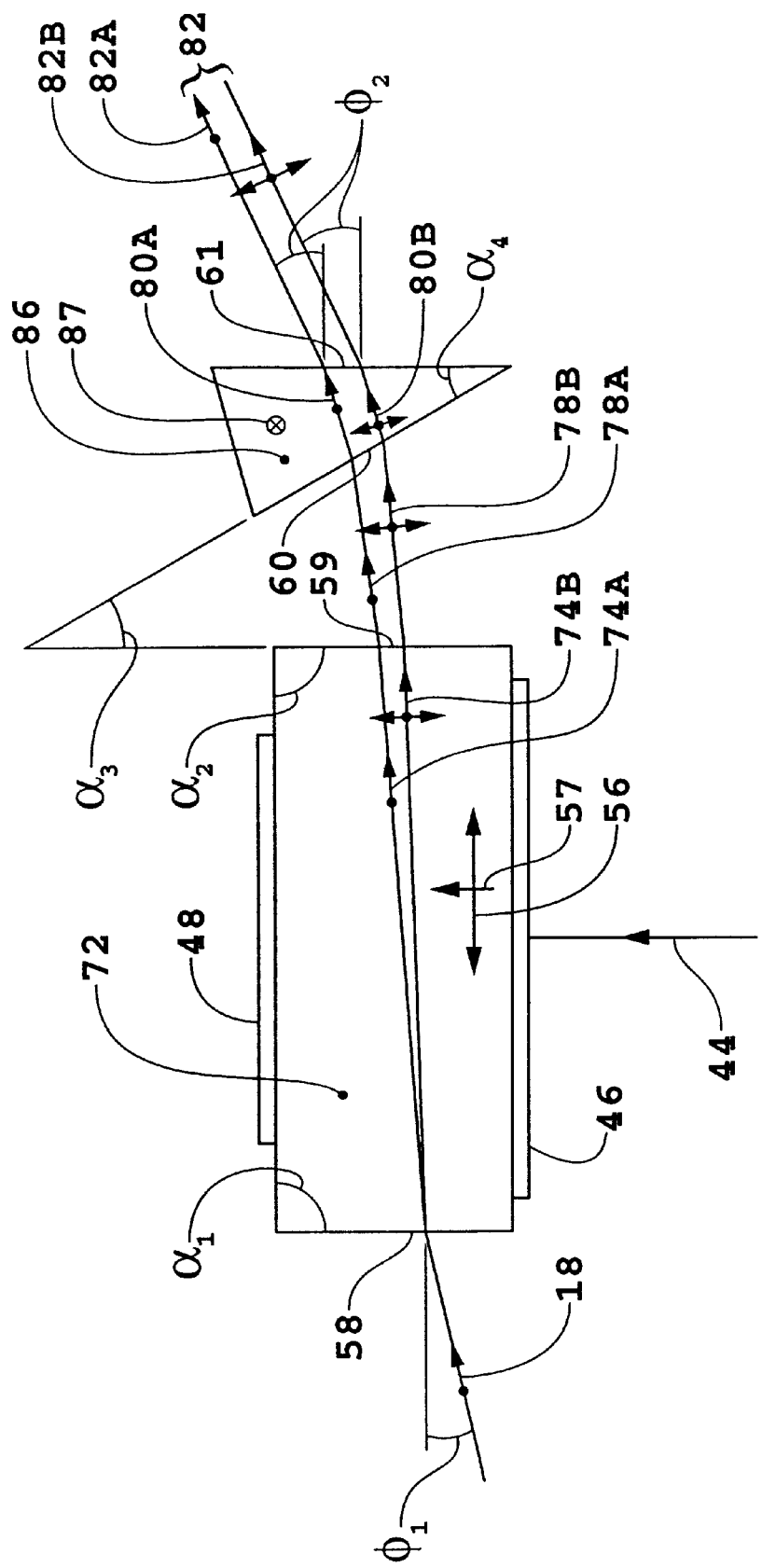
FIG. 6a is a drawing showing the anisotropic acousto-optical crystal (72) of the third embodiment in which optical element (86) external to the acousto-optical crystal (72) is used to collimate the divergent beams exiting acousto-optical crystal (72) so that the output beam components preferably have parallel directions of propagation and preferably are substantially coextensive for following use.

Reference is now made to FIG. 6a which depicts in schematic form the propagation of input beam (18) through an acousto-optical crystal (72) of the presently preferred third embodiment of the present invention for which the energy flux profiles of the output beam components (82A) and (82B) preferably are substantially coextensive and which uses refraction at three different surfaces of birefringent crystals to render the output beam components (82A) and (82B) preferably parallel. The third embodiment is comprised of light source (16), the oscillator (38), and the power amplifier (42) of the first embodiment and the acousto-optical crystal (72) and birefringent prism (86) schematically illustrated in FIG. 6a.

The preferred acousto-optical crystal (72) for the third embodiment is made of a uniaxial crystal (e.g., $LiNbO_3$) having an optical axis (56) in the plane of FIG. 6a which makes an angle $\phi$ (cf. FIG. 5) with a direction of propagation of the acoustic beam (57) generated by the piezoelectric transducer (46). The schematic illustrated in FIG. 6a is for an acousto-optical crystal (72) comprised of a negative uniaxial crystal.

The input beam (18) preferably enters the acousto-optical crystal (72) at surface (58), becoming ordinarily polarized beam (74A) propagating at a small angle $\theta_i$ to the wave front surface of the acoustic beam (57). Due to the photoelastic interaction of beam (74A) with acoustic beam (57), an extraordinarily polarized beam (74B) is generated by small angle Bragg diffraction when the relationships given by Eqs. (1) and (2) are satisfied. The frequency of the diffracted beam (74B) is $f_L - f_0$ while the frequency of the incident ordinarily polarized beam (74A) is $f_L$. The beams (74A) and (74B) impinge on surface (59) and exit acousto-optical crystal (72) as beams (78A) and (78B), respectively. Beams (78A) and (78B) impinge on surface (60) of prism (86), preferably comprised of a birefringent crystal, e.g. $LiNbO_3$. Prism (86) is illustrated in FIG. 6a comprised of a negative uniaxial crystal. The optical axis (87) and the apex edge of prism (86) associated with included angle $\alpha_4$ are preferably aligned perpendicular to the plane of FIG. 6a. Beams (78A) and (78B) enter prism (86) becoming beams (80A) and (80B), respectively. Beams (80A) and (80B) impinge on surface 61 of prism (86) and exit prism (86) as beams (82A) and (82B), respectively. Beams (82A) and (82B) are polarized perpendicular to and in the plane of FIG. 6a, respectively, and comprise an output beam (82).

The respective angles of incidence and refraction for beams (74A), (74B), (78A), and (78B) at surface (59), the respective angles of incidence and refraction for beams (78A), (78B), (80A), and (80B) at surface (60), and the respective angles incidence and refraction for beams (80A), (80B), (82A), and (82B) at surface (61) are chosen, utilizing properties of refraction by birefringent crystals, such that beam components (82A) and (82B) preferably have parallel directions of propagation. The condition with respect to the relative directions of propagation of beam components (82A) and (82B) is obtained by choosing the apex angles $\alpha_3$ and $\alpha_4$ and the angle of refraction $\phi_2$ such that $$\delta = \sin^{-1}\left[\left[\frac{1}{n_o}\sin\left(\left(\alpha_3 - \sin^{-1}\left\{n_o\sin\left[\alpha_4 - \sin^{-1}\left(\frac{\sin\phi_2}{n_o}\right)\right]\right\}\right)\right)\right]\right] - \quad (14)$$
$$\sin\left[\left[\frac{1}{n'_e}\sin\left(\left(\alpha_3 - \sin^{-1}\left\{n_e\sin\left[\alpha_4 - \sin^{-1}\left(\frac{\sin\phi_2}{n_e}\right)\right]\right\}\right)\right)\right]\right]$$

where apex angles $\alpha_3$ and $\alpha_4$ and the angle of refraction $\phi_2$ are defined in FIG. 6a, $n'_e$ is the index of refraction for beam (74B) at surface (59), and $\delta$ is given by Eq. (4). If it is desired to have the beam components (82A) and (82B) be non-parallel, i.e. $\phi_2$ for beam component (82A) not the same as $\phi_2$ for beam component (82B), then the values of the parameters of Equation (14) may be chosen so that beams (82A) and (82B) have a predetermined angle of divergence between them.

The degree of displacement between the energy flux profiles of the output beam components (82A) and (82B) will in general be a small fraction of the corresponding displacement of the output beam components of the first embodiment, the acoustic beam frequencies being equal and of the order of 20 Mhz and the angle $\theta$ between the beam (74B) and the optical axis (56) of acousto-optical crystal (72) being substantially the same as the angle $\theta$ between the beam (24B) and the optical axis (56) of acousto-optical crystal (52). This property with respect to the degree of displacement between the energy flux profiles of the output beam components (82A) and (82B) follows from the discussion of displacements between energy flux profiles presented for the first embodiment and is a direct consequence of no transits across acousto-optical crystal (72) by progenitors of the output beam components (82A) and (82B) after the respective photoelastic interaction transit in contrast to there being in the first embodiment one transit across the acousto-optical crystal (52) by progenitors of the output beam components (32A) and (32B) after the respective photoelastic interaction transit. Expressed in terms of beam diameters, the displacement between the energy flux profiles of the output beam components (82A) and (82B) of the third embodiment will be small fraction of the diameters of the output beam components (82A) and (82B), e.g. of the order of (1/10), so that the output beam components (82A) and (82B) are substantially coextensive. However, it will be recognized that, if spatial separation is desired, it may be achieved even in this type of embodiment if one is willing to tolerate a long separation between the acousto-optical crystal (72) and the birefringent prism (86), and the exit beams may be non-parallel for reasons set forth hereinabove. The remainder of the description of the third embodiment is the same as corresponding portions of the description presented for the first embodiment.

Figure 6B:
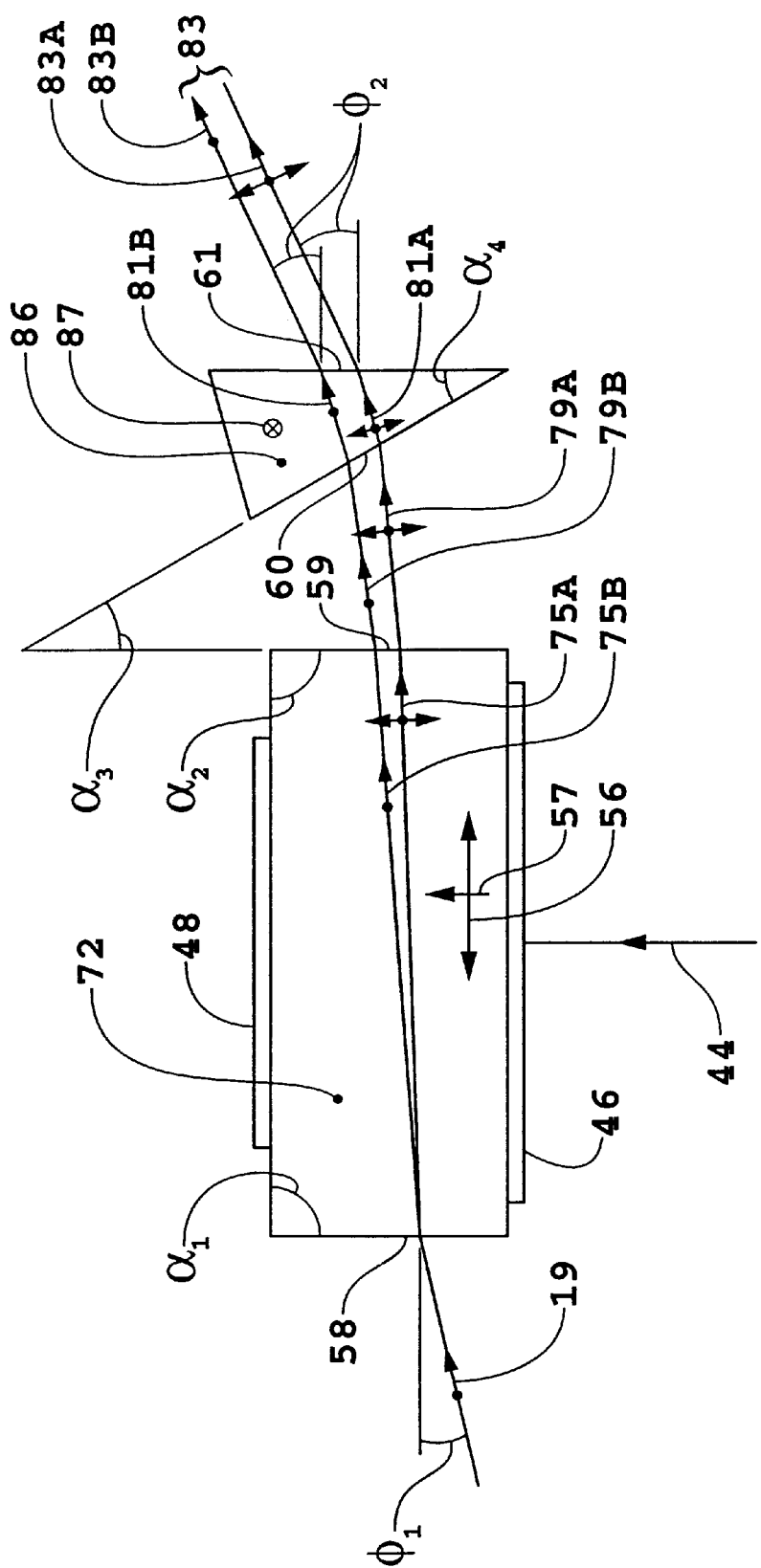
FIG. 6b is a drawing showing the anisotropic acousto-optical crystal (72) of the fourth embodiment in which optical element (86) external to the acousto-optical crystal (72) is used to collimate the divergent beams exiting acousto-optical crystal (72) so that the output beam components preferably have parallel directions of propagation and preferably are substantially coextensive for following use.

Reference is now made to FIG. 6b which depicts in schematic form the propagation of input beam (19) through an acousto-optical crystal (72) of the presently preferred fourth embodiment of the present invention for which the energy flux profiles of the output beam components (83A) and (83B) are substantially coextensive and which uses refraction at three different surfaces of birefringent crystals to render the output beam components (83A) and (83B) preferably parallel. The fourth embodiment is comprised of light source (16), the oscillator (38), and the power amplifier (42) of the second embodiment and the acousto-optical crystal (72) and birefringent prism (86) of the third embodiment schematically illustrated in FIG. 6b.

The input beam (19) preferably enters acousto-optical crystal (72) at surface (58), becoming an extraordinarily polarized beam (75A) propagating at a small angle $\theta_i$ to the wave front surface of the acoustic beam (57). Due to the photoelastic interaction of beam (75A) with acoustic beam (57), an ordinarily polarized beam (75B) is generated by small angle Bragg diffraction when the relationships given by Eqs. (1) and (2) are satisfied. The frequency of the diffracted beam (75B) is $f_L + n_0$ while the frequency of the incident ordinarily polarized beam (75A) is $f_L$. The beams (75A) and (75B) impinge on surface (59) and exit acousto-optical crystal (72) as beams (79A) and (79B), respectively. Beams (79A) and (79B) impinge on surface (60) of prism (86). The optical axis (87) of prism (86) is preferably aligned perpendicular to the plane of FIG. 6b. Beams (79A) and (79B) enter prism (86) becoming beams (81A) and (81B), respectively. Beams (81A) and (81B) impinge on surface 61 of prism (86) and exit prism (86) as beams (83A) and (83B), respectively. Beams (83A) and (83B) are polarized in the plane of and perpendicular to the plane of FIG. 6b, respectively, and comprise the output beam (83).

The respective angles of incidence and refraction for beams (75A), (75B), (79A), and (79B) at surface (59), the respective angles of incidence and refraction for beams (79A), (79B), (81A), and (81B) at surface (60), and the respective angles incidence and refraction for beams (81A), (81B), (83A), and (83B) at surface (61) are chosen, utilizing properties of refraction by birefringent crystals, such that beam components (83A) and (83B) preferably have parallel directions of propagation. The condition with respect to the relative directions of propagation of beam components (83A) and (83B) is obtained by choosing the apex angles $\alpha_3$ and $\alpha_4$ and the angle of refraction $\phi_2$ such that $$\delta = \sin^{-1}\left[\left[\frac{1}{n_o}\sin\left(\left(\alpha_3 - \sin^{-1}\left\{n_o\sin\left[\alpha_4 - \sin^{-1}\left(\frac{\sin\phi_2}{n_o}\right)\right]\right\}\right)\right)\right]\right] - \quad (15)$$

$$\sin\left[\left[\frac{1}{n'_e}\sin\left(\left(\alpha_3 - \sin^{-1}\left\{n_e\sin\left[\alpha_4 - \sin^{-1}\left(\frac{\sin\phi_2}{n_e}\right)\right]\right\}\right)\right)\right]\right]$$

where apex angles $\alpha_3$ and $\alpha_4$ and the angle of refraction $\phi_2$ are defined in FIG. 6b, $n'_e$ is the index of refraction for beam (75A) at surface (59), and $\delta$ is given by Eq. (4). Again, if it is desired to have the beam components (83A) and (83B) be non-parallel, i.e. $\phi_2$ for beam component (83A) not the same as $\phi_2$ for beam component (83B), then the values of the parameters of Equation (15) may be chosen so that beams (83A) and (83B) have a predetermined angle of divergence between them.

The remainder of the description of the fourth embodiment is the same as corresponding portions of the description presented for the third embodiment. In particular, the output beam components (83A) and (83B) are preferably substantially coextensive with parallel directions of propagation.

Figure 7A:
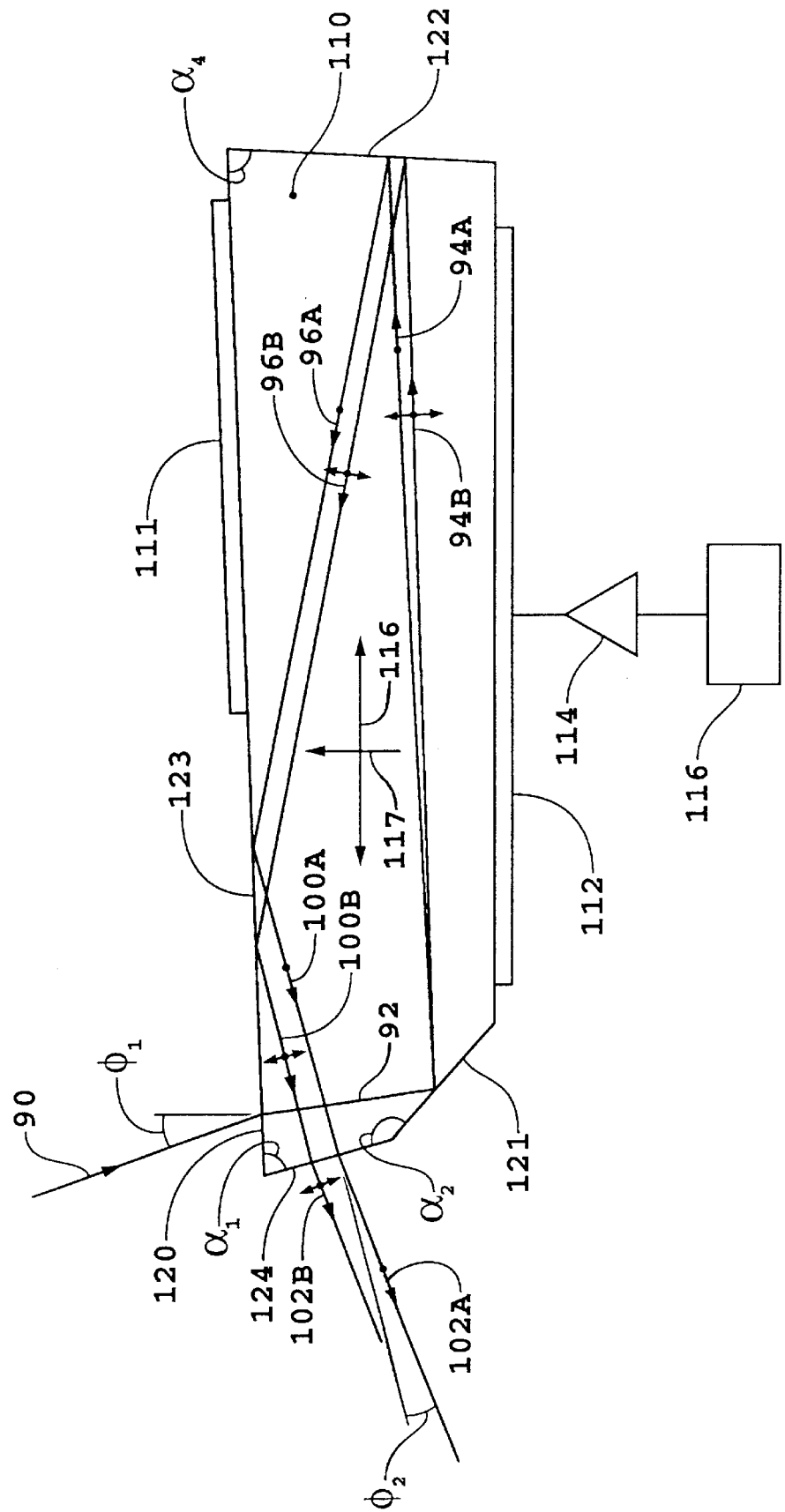
FIG. 7a depicts in schematic form the detailed propagation of the light beams through the anisotropic acousto-optical crystal for the presently preferred fifth embodiment of the present invention which uses two internal reflections and one refraction at surfaces of the birefringent acousto-optical crystal to render the output beams preferably parallel and substantially coextensive.

FIG. 7a depicts in schematic form the propagation of input light beam (90), which is equivalent to beam (18) of the first embodiment, through the acousto-optical crystal (110) of the presently preferred fifth embodiment of the present invention which uses two internal reflections and one refraction at surfaces of the acousto-optical crystal (110) to render the output beams (102A) and (102B) preferably parallel and substantially coextensive. Output beams (102A) and (102B) are linearly and orthogonally polarized. The displacement between the energy flux profiles present between exit beams (102A) and (102B) is reduced in relation to the displacement between the energy flux profiles present between components of exit beams (32) and (33) of the first and second embodiments and variants thereof. The frequencies of the exit beams (102A) and (102B) are frequency shifted one respect to the other by frequency $f_0$.

Electrical oscillator (116) preferably provides a frequency stabilized electrical signal of frequency $f_0$ to a conventional power amplifier (114). The electrical output of power amplifier (114) is preferably used to drive a conventional piezoelectric transducer (112) affixed to an acousto-optical crystal (110). Piezoelectric transducer (112) is used to generate an acoustic beam preferably of the shear wave type. Conventional techniques known to those skilled in the art of acousto-optical modulation are used to absorb in a preferred distribution the acoustic beam that passes through to the walls of acousto-optical crystal (110) for the purpose of substantially reducing temperature gradients in acousto-optical crystal (110). The absorption of the acoustic beam at the walls of acousto-optical crystal (110) is by absorber (111). The distribution of absorber (111) on the surface of acousto-optical crystal (110) is by design one which permits absorber (111) to make the distribution of energy dissipation of the acoustic beam at the walls of acousto-optical crystal (110) correspond to the preferred distribution of absorption of the acoustic beam.

The presently preferred acousto-optical crystal (110) of the fifth embodiment is made of a uniaxial crystal (e.g., LiNbO$_3$) having an optical axis (116) in the plane of FIG. 7a which makes an angle $\phi$ (c.f. FIG. 5) with the direction of propagation of the acoustic wave (117) generated by the piezoelectric transducer (112). The schematic illustrated in FIG. 7a is for an acousto-optical crystal (110) comprised of a negative uniaxial crystal.

Input beam (90), such as illustrated in FIG. 7a, preferably enters the acousto-optical crystal (110) at surface (120) becoming an ordinarily polarized beam (92). Beam (92) is reflected by surface (121) becoming an ordinarily polarized beam (94A). Due to the photoelastic interaction of incident beam (94A) with the acoustic wave (117), an extraordinarily polarized beam, diffracted beam (94B), is generated by small angle Bragg diffraction when the relationships expressed by Eqs. (1) and (2) are satisfied. The angles $\theta_i$ and $\theta_d$ are the angles between incident beam (94A) and the normal to the acoustic K-vector and the angle between diffracted beam (94B) and the normal to the acoustic K-vector, respectively. The definitions of positive $\theta_i$ and $\theta_d$ are again those illustrated in FIG. 5.

Diffracted beam (94B) propagates at a small angle to that of the incident beam (94A), the polarization of diffracted beam (94B) being orthogonal to that of incident beam (94A). In addition, the frequency of beam (94B) is $f_L - f_0$ while the frequency of beam (94A) is $f_L$. Beams (94A) and (94B) are reflected by crystal face (122) as beams (96A) and (96B), respectively, beams (96A) and (96B) are reflected by crystal face (123) as beams (100A) and (100B), respectively, and beams (100A) and (100B) exit acousto-optical crystal (110) at face (124) as beams (102A) and (102B), respectively.

The respective angles of incidence and refraction for beam (90) at surface (120) and the respective angles of incidence and reflection for beam (92) at surface (121) are chosen so that $\theta_i$ satisfies Eq. (1). The condition with respect to the direction of propagation of beam (94A) is obtained through the selection of $\phi_1$ and apex angles $\alpha_1$ and $\alpha_2$ defined in FIG. 7a.

The respective angles of incidence and reflection for beams (94A), (94B), (96A), and (96B) at surface (122), the respective angles of incidence and reflection for beams (96A), (96B), (100A), and (100B) at surface (123), and the respective angles of incidence and refraction for beams (100A), (100B), (102A), and (102B) at surface (124) are chosen such that beams (102A) and (102B) are preferably parallel. The condition with respect to the relative directions of propagation of beams (102A) and (102B) is obtained by choosing the apex angles such that $$\delta = \left[\alpha_4 - \alpha_1 + \sin^{-1}\left(\frac{\sin\phi_2}{n_o}\right)\right] - \qquad (16)$$
$$\sin^{-1}\left[\left[\frac{n_{6,e}}{n'_{6,e}}\sin\left(\left(\alpha_4 - \sin^{-1}\left\{\frac{n_{5,e}}{n'_{5,e}}\sin\left[\alpha_1 - \sin^{-1}\left(\frac{\sin\phi_2}{n'_{4,e}}\right)\right]\right\}\right)\right)\right]\right]$$

where $\alpha_4$ is defined in FIG. 7a, $n'_{4,e} = n_{5,e}$ are the indices of refraction for beam (100B) at surfaces (124) and (123), respectively, $n'_{5,e} = n_{6,e}$ are the indices of refraction for beam (96B) at surfaces (123) and (122), respectively, and $n'_{6,e}$ is the index of refraction for beam (94B) at surface (122). Also, if it is desired to have the beam components (102A) and (102B) be non-parallel, i.e. $\phi_2$ for beam component (102A) not the same as $\phi_2$ for beam component (102B), then the values of the parameters of Eq. (16) may be chosen so that beams (102A) and (102B) have a predetermined angle of divergence between them.

The spatial displacement between the energy flux profiles for beams (102A) and (102B) is preferably a fraction of the beam diameters. The displacement between beams (102A) and (102B) shown in FIG. 7a is the displacement between the wavefront vectors of the two beams. For purposes of illustration, the relative wavefront vector displacement is shown exaggerated in FIG. 7a. Preferably, the electrical output of the power amplifier (114) is adjusted so that intensity of output beam (102B) relative to the intensity of the input beam (90) is some specified nominal value between 0% and 100%, preferably 50%. The sum of the intensities of beams (102A) and (102B) is nominally equal to the intensity of the input beam (90). Further, beams (102A) and (102B) are orthogonally polarized and propagate in parallel directions. The frequency of output beam (102A) is the same as the frequency of the input beam (90) and the frequency of output beam (102B) is different from the frequency of the input beam (90) by $-f_0$.

An important feature of the fifth embodiment is a reduced spatial separation between the energy flux profiles of output beams (102A) and (102B). The primary contribution to the spatial separation between energy flux profiles of output beams (102A) and (102B) and energy flux profiles of output beam components of the first and second embodiments and variants thereof is the deviation of the energy flux vector from the wave front vector for an optical beam propagating in a birefringent crystal as discussed in the description of the first embodiment.

In the fifth embodiment, the respective $\theta$'s for beams (96B) and (98B) are reduced in comparison to $\theta$'s encountered in the first and second embodiments and variants thereof. In the fifth embodiment, the compensation for the deviation $\delta$ between the incident and diffracted beams (94A) and (94B) is achieved by two internal reflections and one refraction at exit surface of acousto-optical crystal (110). In the first and second embodiments and variants thereof, the compensation for the deviation $\delta$ between the corresponding incident and diffracted beams is achieved by one internal reflection within the respective acousto-optical crystal and one refraction at an exit surface of the respective acousto-optical crystal. The additional internal reflection in the fifth embodiment makes it possible to obtain the reduced $\theta$'s in the fifth embodiment in comparison to the $\theta$'s encountered in the first and second embodiments and variants thereof.

In summary, the contribution to spatial displacements between the output beams (102A) and (102B) in the fifth embodiment produced by the deviation of the energy flux vector from the wave front vector of an optical beam propagating in a birefringent crystal is significantly reduced such that the output beams (102A) and (102B) are substantially coextensive.

Figure 7B:
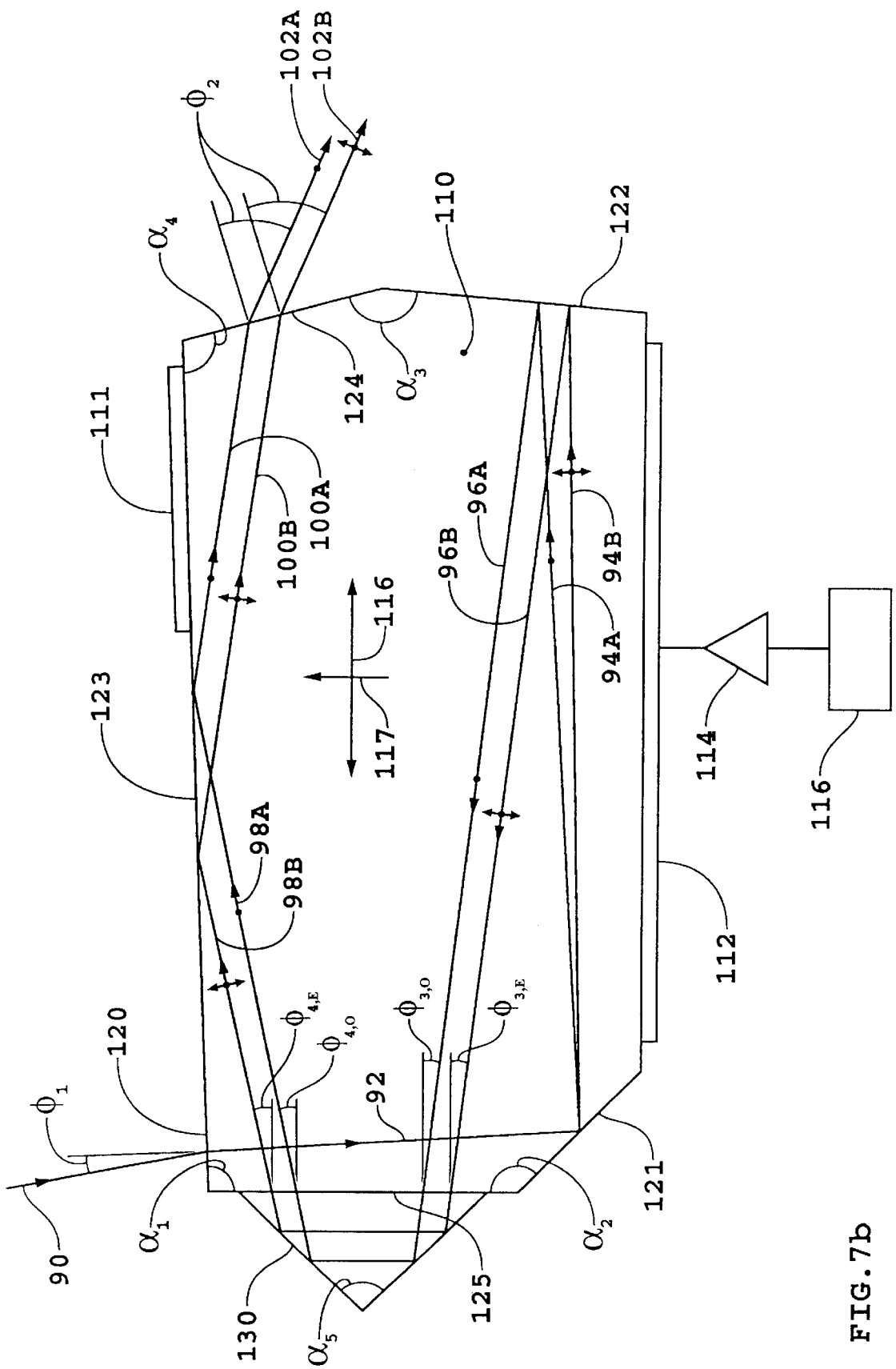
FIG. 7b depicts in schematic form the detailed propagation of the light beams through the anisotropic acousto-optical crystal for the presently preferred first variant of the fifth embodiment of the present invention which uses two internal reflections and three refractions at surfaces of the birefringent acousto-optical crystal to render the output beams preferably parallel and coextensive.

Referring now to FIG. 7b, there is depicted an acousto-optical crystal of the first variant of the fifth embodiment which uses two internal reflections and three refractions at surfaces of the acousto-optical crystal to render the output beam components preferably parallel and coextensive. The apparatus of the first variant is comprised of substantially the same elements as the fifth embodiment, elements of the first variant of the fifth embodiment performing like operations as like denoted elements in the fifth embodiment. The output beam components generated by the first variant of the fifth embodiment have nominally a zero relative spatial displacement between their respective energy flux profiles.

Input beam (90), such as illustrated in FIG. 7b, preferably enters the acousto-optical crystal (110) at surface (120) becoming an ordinarily polarized beam (92). Beam (92) is reflected by surface (121) becoming an ordinarily polarized incident beam (94A). Due to the photoelastic interaction of incident beam (94A) with the acoustic wave (117), an extraordinarily polarized beam, diffracted beam (94B), is generated by small angle Bragg diffraction when Eqs. (1) and (2) are satisfied.

Diffracted beam (94B) propagates at a small angle to that of the incident beam (94A), the polarization of diffracted beam (94B) being orthogonal to that of the incident beam (94A). In addition, the frequency of beam (94B) is $f_L - f_0$ while the frequency of beam (94A) is $f_L$. Beams (94A) and (94B) are reflected by crystal face or facet (122) as beams (96A) and (96B), respectively. Beams (96A) and (96B) are transmitted at crystal face or facet (125) into non-birefringent prism (130) which after two internal reflections directs the beams back into acousto-optical crystal (110) at surface (125) as beams (98A) and (98B), respectively. Beams (98A) and (98B) are reflected by surface (123) as beams (100A) and (100B), respectively, and beams (100A) and (100B) exit acousto-optical crystal (110) at face (124) as beams (102A) and (102B), respectively.

The respective angles of incidence and refraction for beam (90) at surface (120) and the respective angles of incidence and reflection for beam (92) at surface (121) are chosen so that $\theta_i$ satisfies Eq. (1). The angle of deviation between beams (94A) and (94B) is $\delta$ where $\delta$ is given by the Eq. (4). The condition with respect to the direction of propagation of beam (94A) is obtained through the selection of $\phi_1$ and apex angles $\alpha_1$ and $\alpha_2$ defined in FIG. 7b.

The respective angles of incidence and reflection for beams (94A), (94B), (96A), and (96B) at surface (122), the respective angles of incidence and refraction for beams (96A), (96B), (98A), and (98B) at surface (125), the respective angles of incidence and refraction for beams (98A), (98B), (100A), and (100B) at surface (123), and the respective angles of incidence and refraction for beams (100A), (100B), (102A), and (102B) at surface (124) are chosen such that beams (102A) and (102B) are preferably parallel. The condition with respect to the relative directions of propagation of beams (102A) and (102B) is obtained by choosing the apex angles $\alpha_1$, $\alpha_2$, $\alpha_3$, $\alpha_4$, and $\alpha_5$ and the angles $\phi_{3,O}$, $\phi_{3,E}$, $\phi_{4,O}$, and $\phi_{4,E}$ such that $$\delta = \phi_{3,O} - (2\pi - \alpha_1 - \alpha_3 - \alpha_4) - \sin^{-1}\left\{\frac{n_{8,e}}{n'_{8,e}}\sin[\phi_{3,E} - (2\pi - \alpha_1 - \alpha_3 - \alpha_4)]\right\}, \quad (17)$$

$$\phi_{4,O} - \phi_{4,E} = \left[\alpha_1 - \alpha_4 + \sin^{-1}\left(\frac{\sin\phi_2}{n_o}\right)\right] - \left(\left(\alpha_1 - \sin^{-1}\left\{\frac{n_{5,e}}{n'_{5,e}}\sin\left[\alpha_4 - \sin^{-1}\left(\frac{\sin\phi_2}{n'_{4,e}}\right)\right]\right\}\right)\right) \quad (18)$$

where $\alpha_1$, $\alpha_3$, $\alpha_4$, and $\alpha_5$ and the angles $\phi_{3,O}$, $\phi_{3,E}$, $\phi_{4,O}$, and $\phi_{4,E}$ are defined in FIG. 7b, $n'_{4,e}$=$n_{5,e}$ are the indices of refraction for beam (100B) at surfaces (124) and (123), respectively, $n'_{5,e}$ is the index of refraction for beam (98B) at surface (123), and $n_{8,e}$ and $n'_{8,e}$ are the indices of refraction for beams (96B) and (94B), respectively, at surface (122). The output beam is comprised of output beam components (102A) and (102B). If it is desired to have the beam components (102A) and (102B) be non-parallel, i.e. $\phi_2$ for beam component (102A) not the same as $\phi_2$ for beam component (102B), then the values of the parameters of Eqs. (17) and (18) may be chosen so that beams (102A) and (102B) have a predetermined angle of divergence between them.

The apex angles $\alpha_1$, $\alpha_2$, $\alpha_3$, $\alpha_4$, and $\alpha_5$ and the angles $\phi_{3,O}$, $\phi_{3,E}$, $\phi_{4,O}$, and $\phi_{4,E}$ are also selected so that in conjunction with the angle $\theta_i$ being correct and the directions of propagation of output beam components (102A) and (102B) preferably being parallel, the spatial displacement between the energy flux profiles of beams (102A) and (102B) preferably is a nominal value of zero. The displacement between beams (102A) and (102B) shown in FIG. 7b is the displacement between the wavefront vectors of the two beams. For purposes of illustration, the relative wavefront vector displacement between beams (102A) and (102B) is shown exaggerated in FIG. 7b. Preferably, the electrical output of the power amplifier (114) is adjusted so that intensity of output beam (102B) relative to the intensity of the input beam (90) is some specified nominal value between 0% and 100%, preferably 50%. The sum of the intensities of beams (102A) and (102B) is nominally equal to the intensity of the input beam (90). Further, beams (102A) and (102B) are orthogonally polarized and preferably propagate in parallel directions. The frequency of output beam (102A) is the same as the frequency of the input beam (90) and the frequency of output beam (102B) is different from the frequency of the input beam (90) by $-f_O$.

An important feature of the first variant of the fifth embodiment is the nominal zero spatial separation between the energy flux profiles of output beam components (102A) and (102B). In the first variant of the fifth embodiment, the contribution from beam (96B) and the combined contributions from beams (98B) and (100B) to the spatial separation between the energy flux profiles of output beams (102A) and (102B), that are a consequence of the deviations of the energy flux vectors from the wave front vectors, are arranged to be substantially opposite in sign and equal in magnitude. The reversal of sign for the effect of the spatial displacement of the energy flux profile of beam (96B) with respect to the combined effects of the spatial displacements of the energy flux profiles of beams (98B) and (100B) is a consequence of the spatial inversion of beams (98A) and (98B) with respect to (96A) and (96B) produced by non-birefringent prism (130).

Referring now to FIG. 7c, there is depicted a acousto-optical crystal of a second variant of the fifth embodiment which uses one internal reflection and three refractions at surfaces of the acousto-optical crystal to render the output beams preferably parallel and coextensive. The apparatus of the second variant is comprised of substantially the same elements as the first variant of the fifth embodiment, elements of the second variant of the fifth embodiment performing like operations as like denoted elements in the first variant of the fifth embodiment. The energy flux profiles of output beams generated by the second variant of the fifth embodiment preferably have a relative spatial displacement of nominal value zero.

Input beam (90), such as illustrated in FIG. 7c, preferably enters acousto-optical crystal (110) at surface (120) becoming an ordinarily polarized beam (92). Beam (92) is reflected by surface (121) becoming an ordinarily polarized incident beam (94A). Due to the photoelastic interaction of incident beam (94A) with the acoustic wave (117), an extraordinarily polarized beam, diffracted beam (94B), is generated by Bragg diffraction, preferably small angle Bragg diffraction, when Eqs. (1) and (2) are satisfied.

Diffracted beam (94B) propagates at a small angle to that of the incident beam (94A), the polarization of diffracted beam (94B) being orthogonal to that of incident beam (94A). In addition, the frequency of beam (94B) is $f_L-f_O$ while the frequency of beam (94A) is $f_L$. Beams (94A) and (94B) are reflected by crystal face (122) as beams (96A) and (96B) respectively. Beams (96A) and (96B) are transmitted at crystal face (125) into non-birefringent prism (140) which after two internal reflections directs the beams back into crystal (110) at surface (125a) as beams (100A) and (100B), respectively. Beams (100A) and (100B) exit acousto-optical crystal (110) at face (124) as beams (102A) and (102B), respectively.

The respective angles of incidence and refraction for beam (90) at surface (120) and the respective angles of incidence and reflection for beam (92) at surface (121) are chosen so that $\theta_i$ satisfies Eq. (1). The angle of deviation between beams (94A) and (94B) is $\delta$ where $\delta$ is given by the Eq. (4). The condition with respect to the direction of propagation of beam (94A) is obtained through the selection of $\phi_1$ and apex angles $\alpha_1$, $\alpha_2$, and $\alpha_{2a}$ defined in FIG. 7c.

The respective angles of incidence and reflection for beams (94A), (94B), (96A), and (96B) at surface (122), the respective angles of incidence for beams (96A) and (96B) at surface (125), the respective angles of refraction for beams (100A) and (100B) at surface (125a), and the respective angles of incidence and refraction for beams (100A) (100B), (102A) and (102B) at surface (124) are chosen such that beams (102A) and (102B) preferably are parallel. The condition with respect to the relative directions of propagation of beams (102A) and (102B) is obtained by choosing the apex angles $\alpha_1$, $\alpha_2$, $\alpha_{2a}$, $\alpha_3$, $\alpha_4$, and $\alpha_5$ and the angles $\phi_{3,O}$, $\phi_{3,E}$, $\phi_{4,O}$, and $\phi_{4,E}$ such that $$\delta = [(2\pi - \alpha_1 - \alpha_3 - \alpha_4) - \phi_{3,O}] - \qquad (19)$$
$$\sin^{-1}\left\{\frac{n_{8,e}}{n'_{8,e}}\sin[(2\pi - \alpha_1 - \alpha_3 - \alpha_4) - \phi_{3,E}]\right\},$$

$$\phi_{4,O} - \phi_{4,E} = \sin^{-1}\left(\frac{\sin\phi_2}{n_o}\right) - \sin^{-1}\left(\frac{\sin\phi_2}{n'_{4,E}}\right) \qquad (20)$$

where $\alpha_1$, $\alpha_2$, $\alpha_{2a}$, $\alpha_3$, $\alpha_4$, and $\alpha_5$ and the angles $\phi_{3,O}$, $\phi_{3,E}$, $\phi_{4,O}$, and $\phi_{4,E}$ are defined in FIG. 7c, $n'_{4,e}$ is the index of refraction for beam (100B) at surface (124), and $n_{8,e}$ and $n'_{8,e}$ are the indices of refraction for beams (96B) and (94B). respectively, at surface (122). The output beam is comprised of output beam components (102A) and (102B). If it is desired to have the beam components (102A) and (102B) be non-parallel, i.e. $\phi_2$ for beam component (102A) not the same as $\phi_2$ for beam component (102B), then the values of the parameters of Eqs. (19) and (20) may be chosen so that beams (102A) and (102B) have a predetermined angle of divergence between them.

The apex angles $\alpha_1$, $\alpha_2$, $\alpha_{2a}$, $\alpha_3$, $\alpha_4$, and $\alpha_5$ and the angles $\phi_{3,O}$, $\phi_{3,E}$, $\phi_{4,O}$, and $\phi_{4,E}$ are also selected so that in conjunction with the angle $\theta_i$ being correct and the directions of propagation of output beam components (102A) and (102B) being parallel, the spatial displacement between the energy flux profiles of beams (102A) and (102B) preferably is nominally zero. The displacement between beams (102A) and (102B) shown in FIG. 7c is the displacement between the wave front vectors of the two beams. For purposes of illustration, the displacement between beams (102A) and (102B) is shown exaggerated in FIG. 7c. Preferably, the electrical output of the power amplifier (114) is adjusted so that intensity of output beam (102B) relative to the intensity of the input beam (90) is some specified nominal value between 0% and 100%, preferably 50%. The sum of the intensities of beams (102A) and (102B) is nominally equal to the intensity of the input beam (90). Further, beams (102A) and (102B) are orthogonally polarized and propagate in preferably in parallel directions. The frequency of output beam (102A) is the same as the frequency of the input beam (90) and the frequency of output beam (102B) is different from the frequency of the input beam (90) by $-f_0$.

An important feature of the second variant of the fifth embodiment like the first variant of the fifth embodiment is the nominal zero spatial separation between the energy flux profiles of output beam components (102A) and (102B). In the second variant of the fifth embodiment, the contribution from beam (96B) and the contribution from beam (100B) to the spatial separation between the energy flux profiles of output beams (102A) and (102B), that are a consequence of the deviations of the energy flux vectors from the wave front vectors, are arranged to be substantially opposite in sign and equal in magnitude The reversal of sign for the effect of the spatial displacement of the energy flux profile of beam (96B) with respect to the effect of the spatial displacement of the energy flux profile of beam (100B) is a consequence of the spatial inversion of beams (100A) and (100B) with respect to (96A) and (96B) produced by non-birefringent prism (140).

Figure 8:
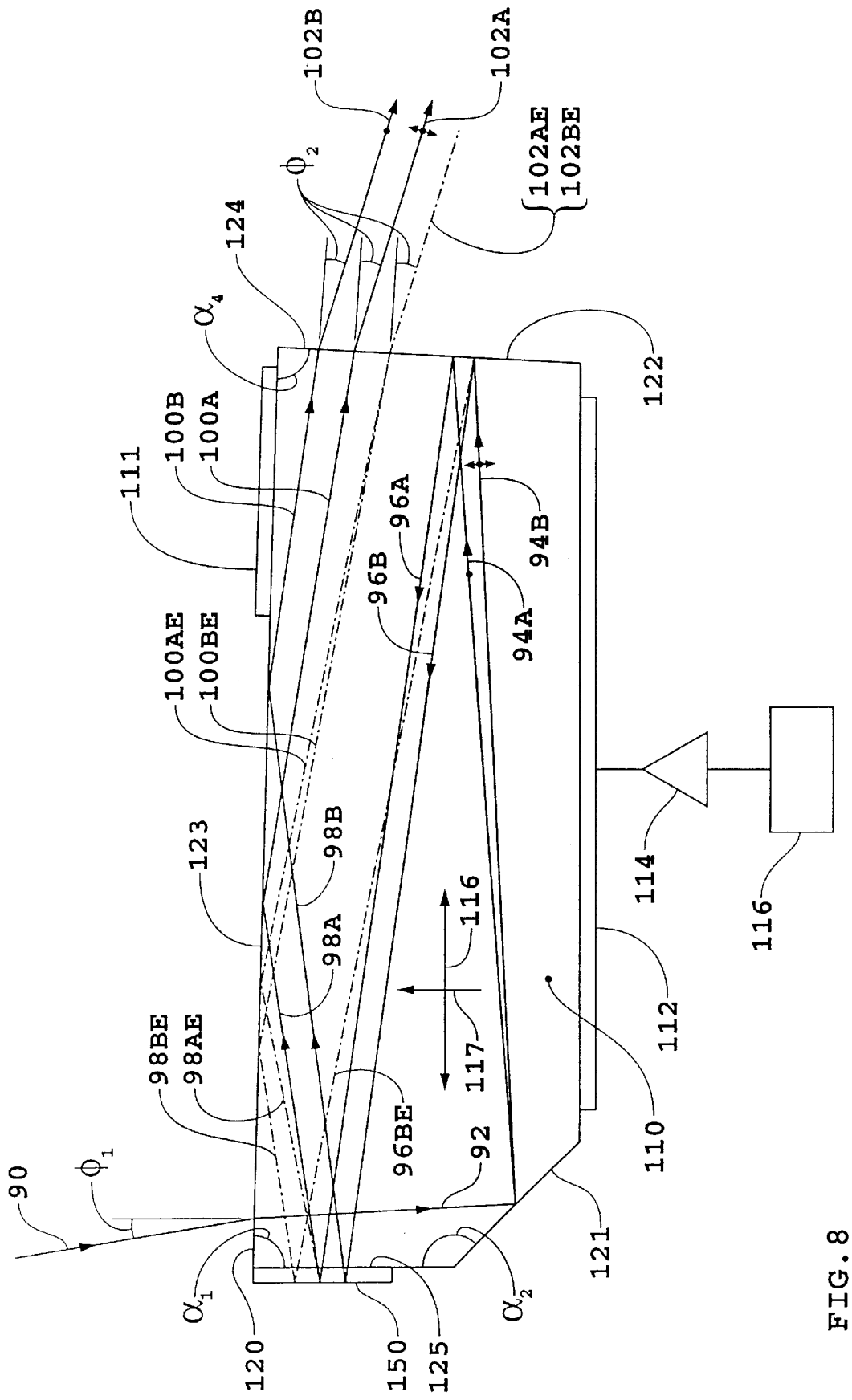
FIG. 8 depicts in schematic form the detailed propagation of the light beams through the anisotropic acousto-optical crystal for the presently preferred sixth embodiment of the present invention which uses two internal reflections and three refractions at surfaces of the birefringent acousto-optical crystal and a phase retardation plate to render the output beams preferably parallel and coextensive and to compensate for phase shifts between the output beams relative to the phase of the acoustic beam that result from temperature changes in the acousto-optical crystal.

Referring now to FIG. 8, an acousto-optical crystal of presently preferred sixth embodiment of the present invention is depicted which uses two internal reflections and three refractions at surfaces of the acousto-optical crystal and a phase retardation plate to render the output beam components preferably parallel and coextensive and to compensate for phase shifts between the output beam components relative to the phase of the acoustic beam that are produced by temperature changes in the acousto-optical crystal. The apparatus of the sixth embodiment is comprised of substantially the same elements as the first variant of the fifth embodiment, elements of the sixth embodiment performing like operations as like elements in the first variant of the fifth embodiment. The energy flux profiles of output beam components generated by the sixth embodiment preferably have a relative spatial displacement of nominal value zero, and the relative phases of the output beams at the exit face of the acousto-optical crystal relative to the phase of the acoustic beam have been compensated for temperature changes in the acousto-optical crystal.

Input beam (90), such as illustrated in FIG. 8, preferably enters acousto-optical crystal (110) at surface (120) becoming an ordinarily polarized beam (92). Beam (92) is reflected by surface (121) becoming an ordinarily polarized incident beam (94A). Due to the photoelastic interaction of incident beam (94A) with the acoustic wave (117), an extraordinarily polarized beam, diffracted beam (94B), is generated by Bragg diffraction, preferably small angle Bragg diffraction, when Eqs. (1) and (2) are satisfied.

Diffracted beam (94B) propagates at a small angle to that of the incident beam (94A), the polarization of diffracted beam (94B) being orthogonal to that of incident beam (94A). In addition, the frequency of beam (94B) is $f_L - f_0$ while the frequency of beam (94A) is $f_L$. Beams (94A) and (94B) are reflected by crystal face or facet (122) as beams (96A) and (96B), respectively. Beams (96A) and (96B) are transmitted at crystal face or facet (125) into quarter-wave phase retardation plate (150) which after one internal reflection directs the beams back into acousto-optical crystal (120) at surface (125) as beams (98A) and (98B), respectively. The orientation of phase retardation plate (150) is adjusted so that the polarizations of beams (98A) and (98B) are rotated by 90 degrees with respect to the polarizations of beams (96A) and (96B), respectively, i.e. beams (98A) and (98B) are extraordinarily and ordinarily polarized, respectively. Beams (98A) and (98B) are reflected by surface (123) as beams (100A) and (100B), respectively, and beams (100A) and (100B) exit acousto-optical crystal between beams (94A) and (94B) is $\delta$ where $\delta$ is given by the Eq. (4). The condition with respect to the direction of propagation of beam (94B) is obtained through the selection of $\phi_1$ and apex angles $\alpha_1$, and $\alpha_2$ defined in FIG. 8.

The respective angles of incidence and reflection for beams (94A), (94B), (96A), and (96B) at surface (122), the respective angles of incidence and refraction for beams (96A), (96B), (98A), and (98B) at surface (125), the respective angles of incidence and reflection for beams (98A), (98B), (100A), and (100B) at surface (123), and the respective angles of incidence and refraction for beams (100A), (100B), (102A), and (102B) at surface (124) are chosen such that beams (102A) and (102B) are preferably parallel. The condition with respect to the relative directions of propagation of beams (102A) and (102B) is obtained by choosing the apex angles $\alpha_1$ and $\alpha_4$ such that $$\delta = \alpha_1 + \alpha_4 + \phi_3 - \pi - \sin^{-1}\left\{\frac{n_{7,e}}{n'_{7,e}}\sin[\alpha_1 + \alpha_4 + \phi_4 - \pi]\right\}, \quad (21)$$

$$\phi_3 = \sin^{-1}\left[\left[\frac{n_{6,e}}{n_o}\sin\left(\left(\alpha_1 - \sin^{-1}\left\{\frac{n_{5,e}}{n'_{5,e}}\sin\left[\alpha_4 - \sin^{-1}\left(\frac{\sin\phi_2}{n'_{4,e}}\right)\right]\right\}\right)\right)\right]\right], \quad (22)$$

$$\phi_4 = \sin^{-1}\left(\left(\frac{n_o}{n'_{6,e}}\sin\left\{\alpha_1 - \left[\alpha_4 - \sin^{-1}\left(\frac{\sin\phi_2}{n_o}\right)\right]\right\}\right)\right), \quad (23)$$

where $\alpha_1$ and $\alpha_4$ are defined in FIG. 8, $n'_{4,e}=n_{5,e}$ are the indices of refraction for beam (100A) at surfaces (124) and (123), respectively, $n'_{5,e}=n_{6,e}$ are the indices of refraction for beam (98A) at surfaces (123) and (125), respectively, $n'_{6,e}=n_{7,e}$ are the indices of refraction for beam (96B) at surfaces (125) and (122), respectively, and $n'_{7,e}$ is the index of refraction for beam (94B) at surface (122). The effects of retardation plate (150) in Eqs. (21), (22), and (23) beyond the rotation of planes of polarization by 90 degrees are substantially secondary for a low order quarter-wave phase retardation plate and are not included. The output beam is comprised of output beam components (102A) and (102B).

The apex angles $\alpha_1$, $\alpha_2$ and $\alpha_3$ are also selected so that in conjunction with the angle $\theta_i$ being correct, the directions of propagation of output beam components (102A) and (102B) preferably being parallel, and the spatial displacement between the energy flux profiles of beams (102A) and (102B) preferably being a nominal value of zero, the relative phase of beam components (102B) and (102B) at face (124) relative to the phase of the acoustic beam (117) is compensated for temperature changes in acousto-optical crystal (110). The displacement between beams (102A) and (102B) shown in FIG. 8 is the displacement between the wave front vectors of the two beams. For purposes of illustration, the relative wave front vector displacement between beams (102A) and (102B) is shown exaggerated in FIG. 8. Preferably, the electrical output of the power amplifier (114) is adjusted so that intensity of output beam (102B) relative to the intensity of the input beam (90) is some specified nominal value between 0% and 100%, preferably 50%. The sum of the intensities of beams (102A) and (102B) is nominally equal to the intensity of the input beam (90). Further, beams (102A) and (102B) are polarized in the plane and perpendicular to the plane of FIG. 8, respectively, and propagate preferably in parallel directions. The frequency of output beam component (102A) is the same as the frequency of the input beam (90) and the frequency of output beam component (102B) is different from the frequency of the input beam (90) by $-f_0$.

An important feature of the sixth embodiment is that the spatial separation between the energy flux profiles of output beam components (102A) and (102B) can be set at a nominal value of zero. In the sixth embodiment, the contribution from beam (96B) and the combined contributions from beams (98A) and (100A) to the spatial separation between the energy flux profiles of output beam components (102A) and (102B), that are a consequence of the deviations of the energy flux vectors from the wave front vectors, are arranged to be substantially opposite in sign and equal in magnitude. The reversal of sign for the effect of the spatial displacement of the energy flux profile of beam (96B) with respect to the combined effects of the spatial displacements of the energy flux profiles of beams (98A) and (100A) is a consequence of the rotation by 90 degrees of the plane of polarization of beam (98A) with respect to the plane of polarization of (96A) and the rotation by 90 degrees of the plane of polarization of beam (98B) with respect to the plane of polarization of beam (96B), the rotation of the planes polarization being produced by phase retardation plate (150).

The effects of the difference in directions of the energy flux vector and wavefront vector are illustrated in FIG. 8. The propagation of the energy fluxes for beams (96B), (98A), (98B), (100A), (100B), (102A), and (102B) are shown in FIG. 8 as beam (96BE), (98AE), (98BE), (100AE), (100BE), (102AE), and (102BE), respectively, by dashed lines. Note that the energy flux profiles for beams (102A) and (102B), respectively energy flux beams (102AE) and (102BE), are coextensive.

A second important feature of the sixth embodiment is the compensation for the effects of temperature changes in acousto-optical crystal (110) on the relative phases of beam components (102A) and (102B) at face (124) relative to the phase of the acoustic beam (117). Temperature induced phase shifts between output beam components (102A) and (102B) relative to the phase of the acoustic beam arise primarily from two effects, the change with temperature in the difference between the ordinary and extraordinary principal indices of refraction and the change with temperature in the speed of the acoustic beam in the acousto-optical crystal (110). The temperature coefficient for the difference in effective indices of refraction of the beam components (102A) and (102B) arising from a change with temperature in the ordinary and extraordinary principal indices of refraction is very low in the inventive apparatus, of the order of or less than $10^{-8}$/(deg C.). The low effective temperature coefficient is the result of a combination of two factors, the first factor being a $\sin^2\theta$ that appears in the expression $(n_o-n_e)\sin^2\theta$ for the difference in indices of refraction for ordinarily and extraordinarily polarized beams where $\theta$ is the angle between the direction of propagation of the extraordinarily polarized beam and the optical axis of the acousto-optical crystal. The second factor follows from the high level of symmetry in the design of the acousto-optical apparatus. For the design shown in FIG. 8, the $\sin^2\theta$ factor is typically less than or approximately 0.015. For beam (94B) in particular, the $\sin^2\theta$ factor is typically $3\times10^{-4}$. In regard to the second factor, progenitors of beam (102A) are ordinarily polarized beam (96A) and extraordinarily polarized beams (98A) and (100A) while the progenitors of beam (102B) are extraordinarily polarized beam (96B) and ordinarily polarized beams (98B) and (100B). Thus, beams (102A) and (102B) are each individually compensated to a high level for temperature induced changes in $n_o$ and $n_e$ as a result of substantially equal paths of respective progenitor beams as ordinarily and as extraordinarily polarized beams. The combination of the individual compensations, the $\sin^2\theta$ factor, and a $[d(n_e-n_o)/dT]=34\times10^{-6}$/(deg C.) in LiNbO$_3$ yield the effective temperature coefficient of the order of or less than $10^{-8}$/(deg C.).

The change with temperature in the speed of the acoustic beam in the acousto-optical crystal (110) if not compensated gives rise to a temperature induced change in the phase between beam components (102A) and (102B) relative to the phase of the acoustic beam of the order of 0.02 rad/ (deg C.) This effect in the sixth embodiment is compensated by changing $\alpha_1$ by approximately 3 milliradians of arc, consistent with satisfying Eqs. (21), (22), and (23), so as to use the temperature induced change in $(n_e-n_o)$ to compensate for the phase shift caused by a temperature induced change in the speed of the acoustic beam.

A third important feature of the sixth embodiment is a reduced level of output beam contamination of the type leading to non-linearities in phase determined interferometrically. The non-linearities arise from frequency and/or polarization mixing between reference path and measuring path beams. In the sixth embodiment, an incorrect thickness and/or a misalignment of phase retardation plate (150) will introduce spurious beams which can cause beam contamination of the type cited. However, in the sixth embodiment, the energy flux profiles of the spurious beams will be displaced from the energy flux profiles of the coextensive output beams (102A) and (102B) as a result of uncompensated deviations between the energy flux vector and the wave front vectors for the spurious output beams. The contamination of the output of the sixth embodiment can be reduced by placing an aperture so as to pass output beam components (102A) and (102B) but intercept that portion of the spurious output beams displaced outside the boundaries of the output beam components (102A) and (102B). The resulting reduction in contamination can be significant.

It will be apparent to those skilled in the art that there is a variant of the sixth embodiment wherein the beams (98A) and (98B) do not reflect from surface (123) but can pass directly to surface (124) and exit the acousto-optical crystal while retaining the important features of the sixth embodiment. However, the acousto-optical crystal for such a variant will generally be wider in the direction of propagation of the acoustic beam.

It will be apparent to those skilled in the art that there are variants of the fourth embodiment and the respective variants of the fourth embodiment and of the fifth and sixth embodiments where the input beam (90) is input beam (19) of the second embodiment with the variants having the same respective properties as the corresponding embodiment or variant with respect to directions of propagation and extent of coextensive properties of the output beam components and level of temperature compensation of relative phase shifts of the output beam components relative to the phase of the acoustic beam. The description of these variants is similar to that presented for the second embodiment and respective variants with respect to the tracking of the various beams through a given variant.

The diffraction efficiencies for the cited embodiments of the present invention can be improved by augmenting the design of the apparatus in the embodiments so as to produce two or more passes of the optical beams through the acoustic beam wherein Eqs. (1) and (2) are satisfied. The seventh embodiment is basically the sixth embodiment modified to incorporate a double pass of optical beams through the acoustic beam to improve diffraction efficiency with respect to the power of acoustic beam.

Figure 9:
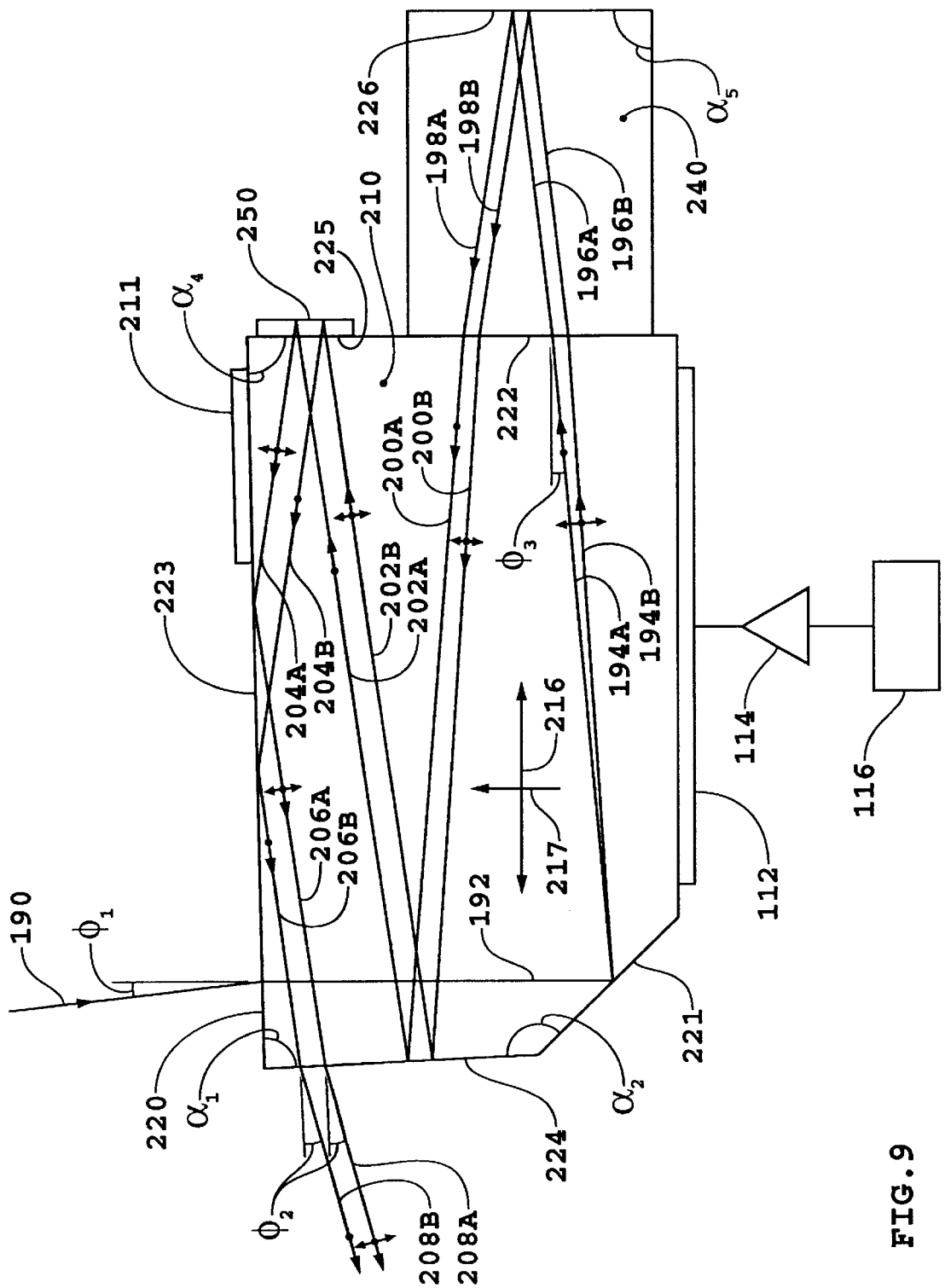
FIG. 9 depicts in schematic form the detailed propagation of the light beams through the anisotropic acousto-optical crystal for the presently preferred seventh embodiment of the present invention which uses a double pass of the light beams through the acousto-optical crystal to increase the diffraction efficiency for a given acoustic power.

FIG. 9 depicts in schematic form a acousto-optical crystal of the presently preferred seventh embodiment of the instant invention. The apparatus of the seventh embodiment is comprised of substantially-the same elements as the sixth embodiment, elements of the seventh embodiment performing like operations as like denoted elements in the sixth embodiment.

Input beam (190), such as illustrated in FIG. 9 and comprised of input beam (18) of the first embodiment, preferably enters the acousto-optical crystal (210) at surface (220) becoming an ordinarily polarized beam (192). Beam (192) is reflected by surface (221) becoming an ordinarily polarized incident beam (194A). Due to the photoelastic interaction of incident beam (194A) with the acoustic wave (217), an extraordinarily polarized beam, diffracted beam (194B), is generated by small angle Bragg diffraction when Eqs. (1) and (2) are satisfied.

Diffracted beam (194B) propagates at a small angle to that of the incident beam (194A), the polarization of diffracted beam (194B) being orthogonal to that of incident beam (194A). In addition, the frequency of beam (194B) is $f_L - f_0$ while the frequency of beam (194A) is $f_L$. Beams (194A) and (194B) are transmitted by crystal face (222) and enter non-birefringent optical element (240) as beams (196A) and (196B), respectively. Beams (196A) and (196B) represent the results of a first pass through acousto-optical crystal (210).

Beams (196A) and (196B) are reflected at surface (226) as beams (198A) and (198B), respectively. Beams (198A) and (198B) exit optical element (240) and reenter acousto-optical crystal (210) as beams (200A) and (200B), respectively. Due to the photoelastic interaction of beams (200A) and (200B) with acoustic beam (217), i.e. Bragg diffraction, the relative amplitudes of beams (200A) and (200B) are transformed in transit through acousto-optical crystal (210) when the conditions expressed by Eqs. (1) and (2) are satisfied.

Upon reflection at surface (226), beams (196A) and (196B) suffer a relative phase shift, a first phase shift of π radians. The first π phase shift occurs in (196A) and (196B) without a corresponding π phase shift being introduced in the phase of the acoustic beam after the photoelastic interaction. This type of phase shift will be referenced as a relative acousto-optical phase shift between two optical beams relative to the phase of the acoustic beam. To understand the impact of the first π phase shift, consider for example the simple case of the surfaces (222) and (226) being in contact In this case, the amplitude of beam (200B) would be nominally zero at surface (224). As a result of the first phase shift, the effects of the Bragg diffraction resulting from the first pass through the acousto-optical crystal (210) are substantially offset by the effects of the Bragg diffraction generated on the second pass through the acousto-optical crystal (210). However, a second π phase shift, also of the class of a relative phase shift of π radians between beams (200A) and (200B) relative to the phase of the acoustic beam after the photoelastic interaction of the first pass and introduced before the photoelastic interaction of the second pass, will cause the amplitudes of beams (200A) and (200B) to transform on transit through the acousto-optical crystal (210) substantially as though the second pass through acoustic beam (217) was simply a direct continuation of the photoelastic interaction path of the first pass.

In the seventh embodiment, the preferred way to effect the second π phase shift is to introduce a displacement of beams (200A) and (200B) relative to beams (194A) and (194B) at surface (222) while essentially not altering the actual relative optical phase of beams (200A) and (200B). For the case of surface (222) being orthogonal to optical axis (216), the second π phase shift is introduced between the relative phase of beams (200A) and (200B) relative to the phase of the acoustic beam in between the first and second passes modulus 2π to a high level of accuracy when $$2d\left\{\tan\left[\sin^{-1}\left(\frac{n_o}{n'}\sin\phi_3\right)\right] - \frac{\lambda_0}{2n'\Lambda}\right\} = \left(\frac{2p+1}{2}\right)\Lambda, \quad (24)$$

$$p = 0, 1, 2, \ldots,$$

where d is the distance between surfaces (222) and (226), n' is the index of refraction of non-birefringent optical element (240), and $\phi_3$ is the angle of incidence of beam (194A) at surface (222) as defined in FIG. 9. Second and higher order terms of $(\lambda_0/\Lambda)$ have been omitted in Eq. (24) and it has also been assumed that $\cos[(\theta_i+\theta_d)/2]\cong 1$. It will be apparent to those skilled in the art that the surface (222) can be orientated at an angle other than at 90 degrees with respect to the optical axis (216) as otherwise required without departing from the spirit and scope of the seventh embodiment.

Beams (200A) and (200B) are reflected by surface (224) as beams (202A) and (202B), respectively. Beams (202A) and (202B) are transmitted at surface (225) into quarter-wave phase retardation plate (250) which, after one internal reflection, directs the beams back into crystal (210) as beams (204A) and (204B), respectively. The orientation of phase retardation plate (250) is adjusted so that the polarizations of beams (204A) and (204B) are rotated by 90 degrees with respect to the polarizations of beams (202A) and (202B), respectively, i.e. beams (204A) and (204B) are extraordinarily and ordinarily polarized, respectively. Beams (204A) and (204B) are reflected by surface (223) as beams (206A) and (206B), respectively, and beams (206A) and (206B) exit acousto-optical crystal (210) at surface (224) as beams (208A) and (208B), respectively.

The respective angles of incidence and refraction for beam (190) at surface (220) and the respective angles of incidence and reflection for beam (192) at surface (221) are chosen so that $\theta_i$ satisfies Eq. (1). The angle of deviation between beams (194A) and (194B) is $\delta$ where $\delta$ is given by the Eq. (4). The condition with respect to the direction of propagation of beam (194A) is obtained through the selection of $\phi_1$ and apex angles $\alpha_1$ and $a_2$ defined in FIG. 9.

The condition that $\theta_i$ for beam (200A) satisfies Eq. (1) is obtained through the selection of apex angle $\alpha_5$ defined in FIG. 9.

The respective angles of incidence and reflection for beams (200A), (200B), (202A), and (202B) at surface (224), the respective angles of incidence and reflection for beams (202A), (202B), (204A), and (204B) at surface (225), the respective angles of incidence and reflection for beams (204A), (204B), (206A), and (206B) at surface (223), and the respective angles of incidence and refraction for beams (206A), (206B), (208A), and (208B) at surface (224) are chosen such that the directions of propagation of beams (208A) and (208B) preferably are parallel. The conditions with respect to the relative directions of propagation of beams (208A) and (208B) are obtained by choosing the apex angles $\alpha_1$ and $a_4$ such that $$\delta = \alpha_4 + \alpha_1 + \phi_5 - \pi - \sin^{-1}\left\{\frac{n_{7,e}}{n'_{7,e}}\sin[\alpha_4 + \alpha_1 + \phi_6 - \pi]\right\}, \quad (25)$$

$$\phi_5 = \sin^{-1}\left[\left[\frac{n_{6,e}}{n_o}\sin\left(\left(\alpha_4 - \sin^{-1}\left\{\frac{n_{5,e}}{n'_{5,e}}\sin\left[\alpha_1 - \sin^{-1}\left(\frac{\sin\phi_2}{n'_{4,e}}\right)\right]\right\}\right)\right)\right]\right], \quad (26)$$

$$\phi_6 = \sin^{-1}\left(\left(\frac{n_o}{n'_{6,e}}\sin\left\{\alpha_4 - \left[\alpha_1 - \sin^{-1}\left(\frac{\sin\phi_2}{n_o}\right)\right]\right\}\right)\right), \quad (27)$$

where $\alpha_1$ and $\alpha_4$ are defined in FIG. 9, $n'_{4,e}=n_{5,e}$ are the indices of refraction for beam (206A) at surfaces (224) and (223), respectively, $n'_{5,e}=n_{6,e}$, are the indices of refraction for beam (204A) at surfaces (223) and (225), respectively, $n'_{6,e}=n_{7,e}$ are the indices of refraction for beam (202B) at surfaces (225) and (224), respectively, and $n'_{7,e}$ is the index of refraction for beam (200B) at surface (224). The effects of retardation plate (150) in Eqs. (25), (26), and (27) beyond the rotation of planes of polarization by 90 degrees are substantially secondary for a low order quarter-wave phase retardation plate and are not included. The output beam is comprised of output beams (208A) and (208B).

The apex angles $\alpha_1$, $\alpha_2$, $\alpha_4$ and $\alpha_5$ are also selected so that in conjunction with the angles $\theta_i$ being correct and the directions of propagation of output beams (208A) and (208B) preferably being parallel and the spatial displacement between the energy flux profiles of beams (208A) and (208B) preferably being a nominal value of zero, the relative phase of beams (208A) and (208B) at face (224) relative to the phase of acoustic beam (217) is compensated for temperature changes in acousto-optical crystal (210). The displacement between beams (208A) and (208B) shown in FIG. 9 is the displacement between the wavefront vectors of the two beams. For purposes of illustration, the relative wavefront vector displacement between beams (208A) and (208B) is shown exaggerated in FIG. 9. Preferably, the electrical output of the power amplifier (114) is adjusted so that intensity of output beam (208B) relative to the intensity of the input beam (190) is some specified nominal value between 0% and 100%, preferably 50%. The sum of the intensities of beams (208A) and (208B) is nominally equal to the intensity of the input beam (190). Further, beams (208A) and (208B) are polarized in the plane and perpendicular to the plane of FIG. 9, respectively, and propagate in parallel directions. The frequency of output beam (208A) is the same as the frequency of the input beam (190) and the frequency of output beam (208B) is different from the frequency of the input beam (190) by $-f_0$.

An important feature of the seventh embodiment is the nominal value of zero for the spatial separation between the energy flux profiles of output beams (208) and (208B). The basis for the nominal zero spatial displacement between the energy flux profiles of output beam components (208A) and (208B) is the same as that for the nominal zero spatial displacement between the energy flux profiles of output beam components (102A) and (102B) of the sixth embodiment.

A second important feature of the seventh embodiment is the compensation for the effects of temperature changes in acousto-optical crystal (210) on the relative phases of beams (208A) and (208B) at face (224) relative to the phase of the acoustic beam (217). The basis for the compensation for the temperature effects is the same as that for the compensation for the effects of temperature changes in acousto-optical crystal (110) on the relative phases of beams (102A) and (102B) at face (124) relative to the phase of the acoustic beam (117) of the sixth embodiment.

A third important feature of the seventh embodiment is a reduced level of output beam contamination of the type leading to non-linearities in phase determined interferometrically. The basis for the reduced level of output beam contamination is the same as that for the reduced level of output beam contamination of beams (102A) and (102B) of the sixth embodiment.

It will be apparent to those skilled in the art that there are variants of the seventh embodiment where the input beam (190) is input beam (19) of the second embodiment with the variant having the same respective properties as the seventh embodiment with respect to directions of propagation and coextensive properties of the output beam components. The description of these variants is similar to that presented for the second embodiment and respective variants with respect to the tracking of the various beams through a given variant.

An unusual and inventive characteristic of the acousto-optical apparatus of the seventh embodiment is the use of multiple passes of the optical beams through the acoustic beam to increase the diffraction efficiency of the acousto-optical apparatus.

Another unusual and inventive characteristic of the acousto-optical apparatus of the seventh embodiment is the improved maximum diffraction efficiency for a given photoelastic interaction length. A momentum mismatch between the momentum of the incident and diffracted optical beams and the acoustic beam limits the maximum diffraction efficiency for a single pass to $$\frac{I_d}{I_i} = \frac{\kappa^2}{\kappa^2 + \left(\frac{1}{2}K\Delta\theta\right)^2} \tag{28}$$

where $K\Delta\theta$ is the momentum mismatch in the direction of propagation of the optical beams and $\kappa$ is the magnitude of the coupling constant [c.f. A. Yariv and P. Yeh, *Optical Waves in Crystals* (Wiley, New York), Section 9.5.1 entitled "Small-Angle Bragg Diffraction"].

When the angle between the direction of propagation of the light beam and the acoustic wavefront is small, the interaction length L is the width of the acoustic beam. Consequently, the optical mode amplitudes $A_1$ and $A_2$ are functions of z only, because z measures the depth of penetration in this interaction configuration. The development of the amplitudes $A_1$ and $A_2$ during transit through the photoelastic interaction region are governed by the coupled differential equations $$\frac{dA_1}{dz} = -i\kappa_{12}A_2 e^{i\Delta\alpha z}, \tag{29}$$

$$\frac{dA_2}{dz} = -i\kappa_{12}^* A_1 e^{-i\Delta\alpha z},$$

where $\kappa_{12}$ is the coupling constant (c.f. Yariv and Yeh, op. cit.). The general solution to Eqs. (29) is given by $$\begin{pmatrix} A_1(z_b) \\ A_2(z_b) \end{pmatrix} = C(z_b, z_a, \Delta\alpha) \begin{pmatrix} A_1(z_a) \\ A_2(z_a) \end{pmatrix} \tag{30}$$

where $z_a$ and $z_b$ are the bounds of the acoustic beam in the z direction and the matrix elements $C_{ij}$ of matrix $C(z_b, z_a, \Delta\alpha)$ are given by the equations $$C = \begin{pmatrix} C_{11} & C_{12} \\ C_{21} & C_{22} \end{pmatrix}, \tag{31}$$

$$C_{11}(z_b, z_a, \Delta\alpha) = \left[\cos s(z_b - z_a) - i\left(\frac{\Delta\alpha}{2s}\right)\sin s(z_b - z_a)\right] \times \exp\left[i\left(\frac{\Delta\alpha}{2}\right)(z_b - z_a)\right], \tag{32}$$

$$C_{12}(z_b, z_a, \Delta\alpha) = -i\left[\frac{\kappa_{12}(z_a)}{s}\right]\sin s(z_b - z_a)\exp\left[i\left(\frac{\Delta\alpha}{2}\right)(z_b - z_a)\right], \tag{33}$$

$$C_{21}(z_b, z_a, \Delta\alpha) = -i\left[\frac{\kappa_{12}^*(z_a)}{s}\right]\sin s(z_b - z_a)\exp\left[-i\left(\frac{\Delta\alpha}{2}\right)(z_b - z_a)\right], \tag{34}$$

$$C_{22}(z_b, z_a, \Delta\alpha) = \left[\cos s(z_b - z_a) + i\left(\frac{\Delta\alpha}{2s}\right)\sin s(z_b - z_a)\right] \times \exp\left[-i\left(\frac{\Delta\alpha}{2}\right)(z_b - z_a)\right], \tag{35}$$

$$\kappa^2 = \kappa_{12}\kappa_{12}^*, \tag{36}$$

$$\Delta\alpha = K\Delta\theta, \tag{37}$$

$$s^2 = \kappa^2 + \left(\frac{\Delta\alpha}{2}\right)^2 = \kappa^2 + \left(\frac{K\Delta\theta}{2}\right)^2, \tag{38}$$

and for the pth pass, $$\kappa_{12}(z_{p-1}) = \kappa_{12}(z_0)e^{i\Delta\alpha(z_{p-1}-z_{p-2})\cos^2(p\pi/2)}. \tag{39}$$

Those skilled in the art will appreciate that when the amplitude of the acoustic beam is not uniform in z over the interval $z_a$ to $z_b$, the resulting mathematical expression for matrix $C(z_b, z_a, \Delta\alpha)$ is more complicated than that given Eqs. (31), (32), (33), (34), and (35). However, the important features relevant to the present discussion are retained in the case for which the amplitude of the acoustic beam is uniform in z over the interval $z_a$ to $z_b$.

A momentum mismatch can be caused by a change in the direction of propagation of either the acoustic beam or the optical beam with respect to the optical axis of the Bragg cell. For a single pass acousto-optical apparatus, the effect of either of the two causes of a momentum mismatch are the same and given by Eqs. (30), (31), (32), (33), (34), and (35). However, for the multiple pass acousto-optical apparatus of the seventh embodiment, the effects of the momentum mismatch are different for the two causes. A momentum mismatch $\Delta\alpha$ on the first pass produced by a change in the direction of the acoustic beam will be manifested in the second pass as a momentum mismatch $-\Delta\alpha$. A momentum mismatch $\Delta\alpha$ on the first pass produced by a change in the direction of the optical beam is characterized by the same momentum mismatch $\Delta\alpha$ on the second pass but with the relative phases of the two optical beams shifted with respect to the phase of the acoustic beam, the relative phase shift depending on the technique used to introduce the second $\pi$ phase shift.

The diffraction efficiency is given by the equation $$\frac{I_d}{I_i} = C_{21} C_{21}^* \tag{40}$$

Single Pass

The effect of a change in acoustic beam direction by $\Delta\theta$ or a change in optical beam direction by $-\Delta\theta$ is given by Eq. (34) as $$C_{21}(L, 0, \Delta\alpha) = \left(\frac{-i\kappa_{12}^*}{s}\right) \sin sL \exp\left[-i\left(\frac{\Delta\alpha L}{2}\right)\right] \tag{41}$$

where it has been assumed that $z_a=0$ and $z_b=L$. The maximum value of $C_{21}C_{21}^*$ is $$(C_{21}C_{21}^*)_{Max} = (\kappa^2/s^2) \tag{42}$$

for $$sL = (\pi/2). \tag{43}$$

The result expressed by Eq. (42) is the same as that given by Eq. (28). Thus, the maximum diffraction for a single pass is in general less than one for a finite value of $\Delta\alpha$.

The Effect of a Change in Acoustic Beam Direction for Multiple Pass Configuration Double Pass The solution for the mode amplitudes when there is a change in acoustic beam direction by $\Delta\theta$ in a double pass configuration is $$\begin{pmatrix} A_1(z_2) \\ A_2(z_2) \end{pmatrix} = C(z_2, z_1, -\Delta\alpha) \begin{pmatrix} A_1(z_1) \\ A_2(z_1) \end{pmatrix}, \tag{44}$$

$$\begin{pmatrix} A_1(z_2) \\ A_2(z_2) \end{pmatrix} = C(z_2, z_1, -\Delta\alpha) C(z_1, z_0, \Delta\alpha) \begin{pmatrix} A_1(z_0) \\ A_2(z_0) \end{pmatrix}. \tag{45}$$

The second row, first column matrix element of matrix $C(z_2, z_1, -\Delta\alpha)C(z_1, z_0, \Delta\alpha)$ is $$[C(z_2, z_1, -\Delta\alpha)C(z_1, z_0, \Delta\alpha)]_{21} = -i\left(\frac{\kappa_{12}^*}{s}\right)\exp\left[i\left(\frac{\Delta\alpha}{2}\right)(z_2 - 2z_1)\right] \times \tag{46}$$

$$[\sin sz_2 - i2(\Delta\alpha/2s)\sin sz_1 \sin s(z_2 - z_1)].$$

The ratio of the intensity of the diffracted beam to the intensity of the input beam is given by the magnitude squared of the matrix element $[C(z_2, z_1, -\Delta\alpha)C(z_1, z_0, \Delta\alpha)]_{21}$ as expressed by Eq. (40). For the case of $(z_2-z_1)=(z_1-z_0)$, the maximum value of $|[C(z_2, z_1, -\Delta\alpha)C(z_1, z_0, \Delta\alpha)]_{21}|^2$ is $$|[C(z_2, z_1, -\Delta\alpha)C(z_1, z_0, \Delta\alpha)]_{21}|^2_{Max} = 1 \tag{47}$$

for $$\sin^2 s(z_1 - z_0) = \frac{\sin^2[(1/2)(\pi/2)]}{[1 - (\Delta\alpha/2s)^2]}. \tag{48}$$

Thus, the maximum diffraction efficiency for a double pass can be 1 for a finite value of $\Delta\alpha$.

Triple Pass

The solution for the mode amplitudes when there is a change in acoustic beam direction by $\Delta\theta$ in a triple pass configuration is $$\begin{pmatrix} A_1(z_3) \\ A_2(z_3) \end{pmatrix} = C(z_3, z_2, \Delta\alpha) \begin{pmatrix} A_1(z_2) \\ A_2(z_2) \end{pmatrix} \tag{49}$$

where $A_1(z_2)$ and $A_2(z_2)$ are given by Eq. (45) The second row, first column matrix element of matrix $C(z_3, z_2, \Delta\alpha)C(z_2, z_1, -\Delta\alpha)C(z_1, z_0, \Delta\alpha)$ is $$[C(z_3, z_2, \Delta\alpha)C(z_2, z_1, -\Delta\alpha)C(z_1, z_0, \Delta\alpha)]_{21} = \tag{50}$$

$$-i\left(\frac{\kappa_{12}^*}{s}\right)\exp\left[i\left(\frac{\Delta\alpha}{2}\right)(z_3 - 2z_1)\right] \times$$

$$\left\{ \begin{array}{l} [\sin sz_3 + 4(\Delta\alpha/2s)^2 \sin s(z_3 - z_2)\sin s(z_2 - z_1)\sin sz_1] + \\ i(\Delta\alpha/2s)\left[\begin{array}{l} \sin s(z_3 - z_2)\sin s(z_2 - 2z_1) + \sin s(z_3 - z_2)\sin sz_2 - \\ 2\cos s(z_3 - z_2)\sin s(z_2 - z_1)\sin sz_1 \end{array}\right] \end{array} \right\}.$$

The ratio of the intensity of the diffracted beam to the intensity of the input beam is given by the magnitude squared of the matrix element $[C(z_3, z_2, \Delta\alpha)C(z_2, z_1, -\Delta\alpha)C(z_1, z_0, \Delta\alpha)]_{21}$ as expressed by Eq. (40). For the case of $(z_3-z_2)=(z_2-z_1)$ and $(z_2-z_1)=(z_1-z_0)$, the maximum value of $|[C(z_3, z_2, \Delta\alpha)C(z_2, z_1, -\Delta\alpha)C(z_1, z_0, \Delta\alpha)]_{21}|^2$ is $$|[C(z_3, z_2, \Delta\alpha)C(z_2, z_1, -\Delta\alpha)C(z_1, z_0, \Delta\alpha)]_{21}|^2_{Max} = 1 \tag{51}$$

for $$\sin^2 s(z_1 - z_0) = \frac{\sin^2[(1/3)(\pi/2)]}{[1 - (\Delta\alpha/2s)^2]}. \tag{52}$$

Thus, the maximum diffraction efficiency for a triple pass can be 1 for a finite value of $\Delta\alpha$.

Quadruple Pass

The solution for the mode amplitudes when there is a change in acoustic beam direction by $\Delta\alpha$ in a quadruple pass configuration is $$\begin{pmatrix} A_1(z_4) \\ A_2(z_4) \end{pmatrix} = C(z_4, z_3, -\Delta\alpha) \begin{pmatrix} A_1(z_3) \\ A_2(z_3) \end{pmatrix} \tag{53}$$

where $A_1(z_3)$ and $A_2(z_3)$ are given by Eq. (49). The second row, first column matrix element of matrix $C(z_4, z_3, -\Delta\alpha)C(z_3, z_2, \Delta\alpha)C(z_2, z_1, -\Delta\alpha)C(z_1, z_2, \Delta\alpha)$ is $$[C(z_4, z_3, -\Delta\alpha)C(z_3, z_2, \Delta\alpha)C(z_2, z_1, -\Delta\alpha)C(z_1, z_0, \Delta\alpha)]_{21} = \tag{54}$$

-continued
$$-i\left(\frac{\kappa_{12}^*}{s}\right)\exp\left[i\left(\frac{\Delta\alpha}{2}\right)(z_4 - 4z_1)\right] \times$$

$$\left\{\begin{array}{l}\sin sz_4 + \\ (\Delta\alpha/2s)^2\left[\begin{array}{l}2\sin s(z_4 - z_3)\sin s(z_3 - z_2)\sin s(z_2 - z_0) + \\ 4\cos s(z_4 - z_3)\sin s(z_3 - z_2) \times \\ \sin s(z_2 - z_1)\sin s(z_1 - z_0)\end{array}\right] + \\ i(\Delta\alpha/2s)\sin s(z_4 - z_3) \times \\ \left[\begin{array}{l}-\sin s(z_3 - z_2)\cos s(z_2 - z_0) + \sin s(z_3 - z_0) + \\ 2\sin s(z_3 - z_2)\sin s(z_2 - z_1)\sin s(z_1 - z_0)\end{array}\right]\end{array}\right\}.$$

The ratio of the intensity of the diffracted beam to the intensity of the input beam is given by the magnitude squared of the matrix element $[C(z_4, z_3, -\Delta\alpha)C(z_3, z_2, \Delta\alpha)C(z_2, z_1, -\Delta\alpha)C(z_1, z_2, \Delta\alpha)]_{21}$ as expressed by Eq. (40). For the case of $(z_4-z_3)=(z_3-z_2)$, $(z_3-z_2)=(z_2-z_1)$, and $(z_2-z_1)=(z_1-z_0)$, the maximum value of $|[C(z_4, z_3, -\Delta\alpha)C(z_3, z_2, \Delta\alpha)C(z_2, z_1, -\Delta\alpha)C(z_1, z_0, \Delta\alpha)]_{21}|^2$ is $$|[C(z_4, z_3, \Delta\alpha)C(z_3, z_2, \Delta\alpha)C(z_2, z_1, -\Delta\alpha) \\ C(z_1, z_0, \Delta\alpha)]_{21}|^2_{Max}=1 \quad (55)$$

for $$\sin^2 s(z_1 - z_0) = \frac{\sin^2[(1/4)(\pi/2)]}{[1-(\Delta\alpha/2s)^2]}. \quad (56)$$

Thus, the maximum diffraction efficiency for a quadruple pass can be 1 for a finite value of $\Delta\alpha$.

Fifth and Higher Order Multiple Pass

The results for the second, triple, and quadruple pass configurations each can have a maximum diffraction efficiency of 1 for a finite value of $\Delta\alpha$ when $$\sin^2 s(z_1 - z_0) = \frac{\sin^2[(1/q)(\pi/2)]}{[1-(\Delta\alpha/2s)^2]} \quad (57)$$

where the parameter q is the number of passes. The obvious extrapolation of these properties is that the maximum diffraction efficiency for a finite value of $\Delta\alpha$ can be 1 for configurations with multiple passes of $q\geq 5$ when Eq. (57) is satisfied.

The Effect of a Change in Optical Beam Direction for Multiple Pass Configuration Double Pass The solution for the mode amplitudes when there is a change in optical beam direction by $\Delta\theta$ in a double pass configuration is $$\begin{pmatrix}A_1(z_2)\\A_2(z_2)\end{pmatrix} = C(z_2, z_1, \Delta\alpha)\begin{pmatrix}A_1(z_1)\\A_2(z_1)\end{pmatrix}, \quad (58)$$

$$\begin{pmatrix}A_1(z_2)\\A_2(z_2)\end{pmatrix} = C(z_2, z_1, \Delta\alpha)R(\beta)C(z_1, z_0, \Delta\alpha)\begin{pmatrix}A_1(z_0)\\A_2(z_0)\end{pmatrix}. \quad (59)$$

where matrix $R(\beta)$ introduces the phase shift $2\beta$ between the two orthogonally polarized incident and diffracted optical beams relative to the phase of the acoustic beam during period of the first and second passes through the acousto-optical crystal by the respective optical beams. The phase shift $\beta$ is given by the expression $$\beta = \left(\frac{n_o}{n'}\right)d\Delta\alpha \quad (60)$$

and the matrix $R(\beta)$ is $$R(\beta) \equiv \begin{pmatrix}e^{i\beta} & 0 \\ 0 & e^{-i\beta}\end{pmatrix}. \quad (61)$$

The coupling constant for the pth pass is $$\kappa_{12}(z_{p-1})=\kappa_{12}(z_0)e^{i\Delta\alpha(z_{p-1}-z_0)} \quad (62)$$

The ratio of the intensity of the diffracted beam to the intensity of the input beam is given by the magnitude squared of the matrix element $[C(z_2, z_1, \Delta\alpha)R(\beta)C(z_1, z_0, \Delta\alpha)]_{21}$ as expressed by Eq. (40). For the case of $(z_2-z_1)=(z_1-z_0)$, the maximum value of $|[C(z_2, z_1, \Delta\alpha)R(\beta)C(z_1, z_0, \Delta\alpha)]_{21}|^2$ is $$|[C(z_2, z_1, \Delta\alpha)R(\beta)C(z_1, z_0, \Delta\alpha)]_{21}|^2_{Max}=1 \quad (63)$$

for $$\tan\left[\beta - \frac{\Delta\alpha(z_1-z_0)}{2}\right] = [\Delta\alpha(z_1-z_0)]\left[\frac{\tan s(z_1-z_0)}{s(z_1-z_0)}\right] \quad (64)$$

and $$\sin^2 s(z_1 - z_0) = \frac{\sin^2[(1/2)(\pi/2)]}{[1-(\Delta\alpha/2s)^2]}. \quad (65)$$

Thus, the maximum diffraction efficiency for a double pass can be 1 for a finite value of $\Delta\alpha$.

Triple and Quadruple Pass

Results obtained for triple and quadruple pass configurations are similar to the results obtained for the double pass configuration: the maximum diffraction efficiency for a triple and quadruple pass can be 1 for a finite value of $\Delta\alpha$ when Eqs. (52) and (56), respectively, are satisfied and $\beta$ satisfies Eq. (64).

Fifth and Higher Order Multiple Pass

The results for the second, triple, and quadruple pass configurations each can have a maximum diffraction efficiency for a finite value of $\Delta\alpha$ when Eq. (57) is satisfied and $\beta$ satisfies Eq. (64). The obvious extrapolation of these properties is that the maximum diffraction efficiency for a finite value of $\Delta\alpha$ can be 1 for configurations with multiple passes of $q\geq 5$ when Eq. (57) is satisfied and $\beta$ satisfies Eq. (64).

Having now described several embodiments of the invention, it will be clear the sum of its principal advantages are that the apparatus: is comprised of a single crystal with a piezoelectric transducer bonded directly to the crystal or comprised of a single crystal with piezoelectric transducer bonded directly to the crystal and an external element or elements in a compact size, has high diffraction efficiency, generally has no requirement for external beam stops, has efficiency of nominally 100% for conversion of input intensity into intensities of two orthogonally polarized exit beam components, and the intensity of each of two orthogonally polarized exit beam components may be adjusted to nominally 50% of the input intensity. The apparatus of the present invention also exhibits reduced polarization mixing and has a compact size because of the use of anisotropic Bragg diffraction and generally through the use of internal reflections in an anisotropic crystal. The apparatus of the present invention can produce high diffraction efficiency with reduced acoustic power levels by the use of multiple passes of the optical beams through the acoustic beam at conditions for which the photo-elastic interaction is effective. Furthermore, the angular displacement between orthogonally polarized exit beam components has reduced sensitivity to changes in the temperature or to temperature gradients of the apparatus due in part to the use of anisotropic Bragg diffraction. Changes in the relative phase shift between the output beams and the acoustic beam may be compensated for changes in temperature of the apparatus of the present invention by a symmetrical treatment of the propagation of the output beam components in the anisotropic crystal. The lateral displacement between the components of the output beam may be reduced or compensated in the apparatus of the present invention also by a symmetrical treatment of the propagation of the output beam components in the anisotropic crystal. In addition, the output beams may be parallel or not. There are also no multiple elements of the type to create misalignment of directions of the components of the output beam.

While the invention has been described with reference to particular embodiments thereof, those skilled in the art will be able to make the various modifications to the described embodiments of the invention without departing from the true spirit and scope of the present invention. For example, it will be apparent that biaxial crystals, which are another species of anistropic crystal, except with two optic axes, can be adapted to beneficial use according to the teachings and principles of the present invention. Moreover, either ordinarily or extraordinarily linearized light may be adopted to serve as the input with the conversion being to the opposite to that adopted for the input state. It is intended that all combinations of elements and steps which perform substantially the same function in substantially the same way to achieve the same result are with the scope of the present invention.

What is claimed is:

1. Apparatus for generating a pair of orthogonally polarized beams of different frequency, said apparatus comprising:
   a multifaceted, anisotropic optical crystal having an optic axis, z, said anisotropic optical crystal having a first facet that is nominally parallel to said optic axis;
   transducer means affixed to said first facet for generating an acoustic beam and directing it into said anisotropic optical crystal so that it propagates generally perpendicular to said optic axis to provide an interactive region within said anisotropic optical crystal where the width of said interactive region is generally coextensive with the width of said acoustic beam;
   means for driving said transducer to generate said acoustic beam at a predetermined frequency, $f_O$;
   means for providing a linearly polarized input beam of illumination with a predetermined frequency, $f_L$; and
   means for introducing said linearly polarized input beam into said multifaceted, anisotropic optical crystal so that it propagates through said interaction region at least once with a predetermined portion of it converted by small-angle Bragg diffraction to a second beam, orthogonally polarized with respect to said input beam and altered in frequency by said acoustic beam frequency, $f_O$, the remainder of said input beam and said second beam continuing to propagate through said anisotropic optical crystal along a path as slightly diverging emergent beams,
   said multifaceted, anisotropic optical crystal having at least one facet configured and arranged to at least partially control said emergent beams so that they are available outside of said multifaceted, anisotropic optical crystal as external beams for subsequent downstream use with a predetermined angle of divergence between them and a predetermined spatial separation between their energy flux profiles.

2. The apparatus of claim 1 wherein said predetermined angle of divergence between said external beams is substantially zero so that said external beams travel parallel to one another.

3. The apparatus of claim 1 wherein said at least one facet operates by reflection to control said emergent beams.

4. The apparatus of claim 1 wherein said at least one facet operates by refraction to control said emergent beams.

5. The apparatus of claim 1 wherein said multifaceted, anistropic optical crystal comprises at least one other facet that operates in conjunction with said at least one facet to control said emergent beams.

6. The apparatus of claim 5 wherein said other facet operates by reflection to control said emergent beams.

7. The apparatus of claim 5 wherein said other facet operates by refraction to control said emergent beams.

8. The apparatus of claim 1 further including external means located outside of said multifaceted, anisotropic optical crystal for intercepting said emergent beams and operating in conjunction with said at least one facet to control said emergent beams.

9. The apparatus of claim 8 wherein said external means comprises a birefringent prism.

10. The apparatus of claim 8 wherein said external means comprises a non-birefringent prism.

11. The apparatus of claim 8 wherein said external means comprises a phase retardation plate.

12. The apparatus of claim 8 wherein said external means comprises a non-birefringent block.

13. The apparatus of claim 1 wherein said orthogonally polarized external beams have energy flux profiles that are more or less coextensive.

14. The apparatus of claim 1 wherein the degree of coextensiveness of the energy flux profiles of said orthogonally polarized external beams varies substantially in accordance with the birefringence and acoustical and optical properties of said anisotropic optical crystal, the physical path length over which said emergent beams travel, and the value of said predetermined driving frequency, $f_O$.

15. The apparatus of claim 14 wherein said energy flux profiles of said orthogonally polarized external beams are spatially separated.

16. The apparatus of claim 14 wherein said energy flux profiles of said orthogonally polarized external beams substantially overlap one another.

17. The apparatus of claim 16 wherein said external beams are parallel.

18. The apparatus of claim 1 wherein said acoustic beam comprises a shear wave.

19. The apparatus of claim 1 wherein said transducer comprises a piezoelectric transducer bonded to said first facet.

20. The apparatus of claim 19 wherein said driving means comprises a stabilized electrical oscillator for generating an electrical signal at said predetermined frequency, $f_O$, and a power amplifier for receiving said electrical signal, amplifying it, and supplying power to said transducer.

21. The apparatus of claim 1 wherein said driving means is structured to selectively control the portion of said input beam that is converted to said second beam.

22. The apparatus of claim 21 wherein said portion of said input beam that is converted to said second beam is substantially fifty (50%) percent.

23. The apparatus of claim 1 wherein said input beam enters and exits said interactive region as an ordinarily polarized beam and said second beam is extraordinarily polarized or vice versa.

24. The apparatus of claim 1 wherein said anisotropic optical crystal comprises a uniaxial optical crystal.

25. The apparatus of claim 24 wherein said anisotropic optical crystal comprises lithium niobate.

26. The apparatus of claim 1 wherein selected ones of said the facets of said anisotropic optical crystal are provided with absorbing material to absorb any acoustic power passing through them.

27. The apparatus of claim 1 wherein one of the facets of said anisotropic optical crystal serves as an entrance facet for coupling said input beam into said anisotropic optical crystal.

28. The apparatus of claim 27 wherein said entrance facet is antireflection coated.

29. The apparatus of claim 1 wherein said anisotropic optical crystal comprises two internal reflecting facets and one integral refracting facet to render said diverging emergent beams coextensive and parallel as they emerge from said anisotropic optical crystal through said refracting facet.

30. The apparatus of claim 1 further including a nonbirefringent prism external to said anisotropic optical crystal and wherein said anisotropic optical crystal comprises two internal reflecting surfaces and three integral refracting surfaces that operate in conjunction with said external nonbirefringent prism to render said diverging emergent beams coextensive and parallel as they emerge from said anisotropic optical crystal through one of said three integral refracting surfaces.

31. The apparatus of claim 1 further including a nonbirefringent prism external to said anisotropic optical crystal and wherein said anisotropic optical crystal comprises one internal reflecting surface and three integral refracting surfaces that operate in conjunction with said external nonbirefringent prism to render said diverging emergent beams coextensive and parallel as they emerge from said anisotropic optical crystal through one of said refracting surfaces.

32. The apparatus of claim 1 further including a phase retardation plate external to said anisotropic optical crystal and wherein said anistropic crystal comprises two internal reflecting surfaces and three integral refracting surfaces that operate in conjunction with said phase retardation plate to render said diverging emergent beams coextensive and parallel as they emerge from said anisotropic optical crystal through one of said refracting surfaces and to compensate for temperature changes in said anisotropic optical crystal.

33. The apparatus of claim 1 wherein said anisotropic optical crystal internal surfaces are arranged to facilitate said input beam undergoing a plurality of passes through said interaction region to increase the diffraction efficiency for a given acoustic power.

34. The apparatus of claim 33 further including a non-birefringent element that operates in conjunction with said internal surfaces to provide said plurality of passes through said interaction region to increase the diffraction efficiency for a given acoustic power.

35. Apparatus for generating a pair of parallel, orthogonally polarized beams of different frequency, said apparatus comprising:

a multifaceted, anisotropic optical crystal having an optic axis, z, said crystal having a first facet that is nominally parallel to said optic axis;

transducer means affixed to said first facet for generating an acoustic beam and directing it into said anisotropic optical crystal so that it propagates generally perpendicular to said optic axis to provide an interactive region within said anisotropic optical crystal where the width of said interactive region is generally coextensive with the width of said acoustic beam;

means for driving said transducer to generate said acoustic beam at a predetermined frequency, $f_O$;

means for providing a linearly polarized input beam of illumination with a predetermined frequency, $f_L$; and means for introducing said linearly polarized input beam into said anisotropic optical crystal so that it propagates through said interaction region at least once with a predetermined portion of it converted by small-angle Bragg diffraction to a second beam, orthogonally polarized with respect to said input beam and altered in frequency by said acoustic beam frequency $f_O$, the remainder of said input beam and said second beam continuing to propagate through said anisotropic optical crystal along a path of travel as slightly diverging orthogonally polarized emergent beams, said anisotropic optical crystal having at least one other facet structured to intercept said slightly diverging emergent beams, redirect them along a predetermined direction of travel while simultaneously folding said path of travel, and collimating them so that they travel parallel to one another on exiting said anisotropic optical crystal along a path as orthogonally polarized external beams of different frequency where they are available outside of said anisotropic optical crystal.

36. The apparatus of claim 35 wherein said transducer comprises a piezoelectric transducer bonded to said first facet.

37. The apparatus of claim 36 wherein said driving means comprises a stabilized electrical oscillator for generating an electrical signal at said predetermined frequency, $f_o$, and a power amplifier for receiving said electrical signal, amplifying it, and supplying power to said transducer.

38. The apparatus of claim 35 wherein said driving means is structured to selectively control the portion of said input beam that is converted to said second beam.

39. The apparatus of claim 38 wherein said portion of said input beam that is converted to said second beam is substantially fifty (50%) percent.

40. The apparatus of claim 35 wherein said input beam enters and exits said interactive region as an ordinarily polarized beam and said second beam is extraordinarily polarized or vice versa.

41. The apparatus of claim 35 wherein said anisotropic optical crystal comprises a uniaxial optical crystal.

42. The apparatus of 41 wherein said anisotropic optical crystal comprises lithium niobate.

43. The apparatus of claim 35 wherein selected ones of said the facets of said anisotropic optical crystal are provided with absorbing material to absorb any acoustic power passing through them.

44. The apparatus of claim 35 wherein one of the facets of said anisotropic optical crystal serves as an entrance facet for coupling said input beam into said anisotropic optical crystal.

45. The apparatus of claim 35 wherein said at least one other facet is adapted to operate by reflection.

46. The apparatus of claim 35 wherein the path over which said diverging emergent beams travel inside of said anisotropic crystal is folded at least twice prior to their exiting said anisotropic optical crystal.

47. The apparatus of claim 46 wherein said input beam and exiting beams are angularly separated by substantially 180 degrees.

48. The apparatus of claim 46 wherein said input beam and exiting beams are angularly separated by substantially 360 degrees.

49. The apparatus of claim 35 wherein said orthogonally polarized external beams have energy flux profiles that are more or less coextensive.

50. The apparatus of claim 49 wherein the degree of coextensiveness of the energy flux profiles of said orthogonally polarized external beams varies substantially in accordance with the birefringence and acoustical and optical properties of said anisotropic optical crystal, the physical path length over which said emergent beams travel prior to being collimated, the angle of said at least one other facet, and the value of said predetermined driving frequency, $f_o$.

51. The apparatus of claim 50 wherein said energy flux profiles of said orthogonally polarized external beams are spatially separated.

52. The apparatus of claim 50 wherein said energy flux profiles of said orthogonally polarized external beams substantially overlap one another.

53. The apparatus of claim 35 wherein said acoustic beam comprises a shear wave.

54. Apparatus for generating a pair of parallel, orthogonally polarized beams of different frequency, said apparatus comprising:

a multifaceted, anisotropic optical crystal having an optic axis, z, said crystal having a first facet that is nominally parallel to said optic axis;

transducer means affixed to said first facet for generating an acoustic beam and directing it into said anisotropic optical crystal so that it propagates generally perpendicular to said optic axis to provide an interactive region within said anisotropic optical crystal where the width of said interactive region is generally coextensive with the width of said acoustic beam;

means for driving said transducer to generate said acoustic beam at a predetermined frequency, $f_o$;

means for providing a linearly polarized input beam of illumination with a predetermined frequency, $f_L$;

means for introducing said linearly polarized input beam into said anisotropic optical crystal so that it propagates through said interaction region at least once with a predetermined portion of it converted by small-angle Bragg diffraction to a second beam, orthogonally polarized with respect to said input beam and altered in frequency by said acoustic beam frequency, $f_o$, the remainder of said input beam and said second beam continuing to propagate through said anisotropic optical crystal along a path of travel as slightly diverging orthogonally polarized emergent beams, said emergent beams exiting from said anisotropic optical crystal through an exit facet thereof, diverging therefrom by a small predetermined angle; and means for intercepting said diverging emergent beams and collimating them so that they travel parallel to one another as orthogonally polarized external beams.

55. The apparatus of claim 54 wherein said means for intercepting said divergent emergent beams and collimating them comprises a birefringent prism.

56. The apparatus of claim 55 wherein said birefringent prism is offset with respect to said exit facet and the properties of said prism in combination with said offset operate to collimate said emergent beams.

57. The apparatus of claim 54 wherein said transducer comprises a piezoelectric transducer bonded to said first facet.

58. The apparatus of claim 57 wherein said driving means comprises a stabilized electrical oscillator for generating an electrical signal at said predetermined frequency, $f_o$, and a power amplifier for receiving said electrical signal, amplifying it, and supplying power to said transducer.

59. The apparatus of claim 54 wherein said driving means is structured to selectively control the portion of said input beam that is converted to said second beam.

60. The apparatus of claim 59 wherein said portion of said input beam that is converted to said second beam is substantially fifty (50%) percent.

61. The apparatus of claim 54 wherein said input beam enters and exits said interactive region as an ordinarily polarized beam and said second beam is extraordinarily polarized or vice versa.

62. The apparatus of claim 54 wherein said orthogonally polarized external beams have energy flux profiles that are more or less coextensive.

63. The apparatus of claim 62 wherein the degree of coextensiveness of the energy flux profiles of said orthogonally polarized external beams varies substantially in accordance with the birefringence and acoustical and optical properties of said anisotropic optical crystal, the physical path length over which said emergent beams travel prior to being collimated, and the value of said predetermined driving frequency, $f_o$.

64. The apparatus of claim 63 wherein said energy flux profiles of said orthogonally polarized external beams are spatially separated.

65. The apparatus of claim 63 wherein said energy flux profiles of said orthogonally polarized external beams substantially overlap one another.

66. The apparatus of claim 54 wherein said acoustic beam comprises a shear wave.

67. Apparatus for generating a pair of parallel, orthogonally polarized beams of different frequency, said apparatus comprising:

a multifaceted, anisotropic optical crystal having an optic axis, z, said crystal having a first facet that is nominally parallel to said optic axis;

transducer means affixed to said first facet for generating an acoustic beam and directing it into said anisotropic optical crystal so that it propagates generally perpendicular to said optic axis to provide an interactive region within said anisotropic optical crystal;

means for driving said transducer to generate said acoustic beam at a predetermined frequency, $f_o$;

means for providing a linearly polarized input beam of illumination with a predetermined frequency, $f_L$; and means for introducing said linearly polarized input beam into said anisotropic optical crystal so that it propagates through said interaction region at least once with a predetermined portion of it converted by small-angle Bragg diffraction to a second beam, orthogonally polarized with respect to said input beam and altered in frequency by said acoustic beam frequency, $f_o$, the remainder of said input beam and said second beam continuing to propagate through said anisotropic optical crystal along a path of travel as slightly diverging orthogonally polarized emergent beams, said anisotropic optical crystal having at least one other facet structured to intercept said slightly diverging emergent beams, redirect them along a predetermined direction of travel while simultaneously folding said path of travel, and collimating them so that they travel parallel to one another on exiting said anisotropic optical crystal along a coextensive path as orthogonally polarized external beams of different frequency where they are available outside of said anisotropic optical crystal.

68. The apparatus of claim 67 wherein said transducer comprises a piezoelectric transducer bonded to said first facet.

69. The apparatus of claim 68 wherein said driving means comprises a stabilized electrical oscillator for generating an electrical-signal at said predetermined frequency, $f_o$, and a power amplifier for receiving said electrical signal, amplifying it, and supplying power to said transducer.

70. The apparatus of claim 67 wherein said driving means is structured to selectively control the portion of said input beam that is converted to said second beam.

71. The apparatus of claim 70 wherein said portion of said input beam that is converted to said second beam is substantially fifty (50%) percent.

72. The apparatus of claim 67 wherein said input beam enters and exits said interactive region as an ordinarily polarized beam and said second beam is extraordinarily polarized or vice versa.

73. The apparatus of claim 67 wherein said anisotropic optical crystal comprises a uniaxial optical crystal.

74. The apparatus of 73 wherein said anisotropic optical crystal comprises lithium niobate.

75. The apparatus of claim 67 wherein selected ones of said the facets of said anisotropic optical crystal are provided with absorbing material to absorb any acoustic power passing through them.

76. The apparatus of claim 67 wherein one of the facets of said anisotropic optical crystal serves as an entrance facet for coupling said input beam into said anisotropic optical crystal.

77. The apparatus of claim 67 wherein said other facet is adapted to operate by reflection.

78. The apparatus of claim 67 wherein said path over which said diverging emergent beams travel inside of said anisotropic crystal is folded at least twice prior to their exiting said anisotropic optical crystal.

79. The apparatus of claim 78 wherein said input beam and exiting beams are angularly separated by substantially 90 degrees.

80. The apparatus of claim 79 wherein said input beam and exiting beams are angularly separated by substantially 270 degrees.

81. The apparatus of claim 67 wherein said anisotropic optical crystal comprises two internal reflecting facets and one integral refracting facet to render said diverging emergent beams coextensive and parallel as they emerge from said anisotropic optical crystal through said refracting facet.

82. The apparatus of claim 67 further including a nonbirefringent prism external to said anisotropic optical crystal and wherein said anisotropic optical crystal comprises two internal reflecting surfaces and three integral refracting surfaces that operate in conjunction with said external nonbirefringent prism to render said diverging emergent beams coextensive and parallel as they emerge from said anisotropic optical crystal through one of said three integral refracting surfaces.

83. The apparatus of claim 67 further including a nonbirefringent prism external to said anisotropic optical crystal and wherein said anisotropic optical crystal comprises one internal reflecting surface and three integral refracting surfaces that operate in conjunction with said external nonbirefringent prism to render said diverging emergent beams coextensive and parallel as they emerge from said anisotropic optical crystal through one of said three integral refracting surfaces.

84. The apparatus of claim 67 further including a phase retardation plate external to said anisotropic optical crystal and wherein said anistropic crystal comprises two internal reflecting surfaces and three integral refracting surfaces that operate in conjunction with said phase retardation plate to render said diverging emergent beams coextensive and parallel as they emerge from said anisotropic optical crystal through one of said three integral refracting surfaces and to compensate for temperature changes in said anisotropic optical crystal.

85. The apparatus of claim 67 wherein said anisotropic optical crystal internal surfaces are arranged to facilitate said input beam undergoing a plurality of passes through said interaction region to increase the diffraction efficiency for a given acoustic power.

86. The apparatus of claim 85 further including a non-birefringent element that operates in conjunction with said internal surfaces to provide said plurality of passes through said interaction region to increase the diffraction efficiency for a given acoustic power.

87. The apparatus of claim 1 wherein said input beam and exiting beams are angularly separated by values selected from the group comprising substantially 180, 270, and 360 degrees.

* * * * *